United States Patent
Deshpande et al.

(10) Patent No.: US 9,883,479 B2
(45) Date of Patent: Jan. 30, 2018

(54) GENERATING AND PUBLISHING VALIDATED LOCATION INFORMATION

(71) Applicant: Google Inc., Mountain View, CA (US)

(72) Inventors: Vinit Chandrakant Deshpande, San Jose, CA (US); Prerepa V. Viswanadham, Fremont, CA (US)

(73) Assignee: Google LLC, Mountain View, CA (US)

( * ) Notice: Subject to any disclaimer, the term of this patent is extended or adjusted under 35 U.S.C. 154(b) by 138 days.

(21) Appl. No.: 14/924,771

(22) Filed: Oct. 28, 2015

(65) Prior Publication Data

US 2017/0127373 A1  May 4, 2017

(51) Int. Cl.
| | |
|---|---|
| *H04M 1/66* | (2006.01) |
| *H04W 64/00* | (2009.01) |
| *H04W 4/02* | (2009.01) |
| *H04W 12/06* | (2009.01) |

(52) U.S. Cl.
CPC ......... *H04W 64/003* (2013.01); *H04W 4/023* (2013.01); *H04W 12/06* (2013.01)

(58) Field of Classification Search
CPC .... H04W 64/003; H04W 12/06; H04W 4/023
USPC ........................................................ 455/411
See application file for complete search history.

(56) References Cited

U.S. PATENT DOCUMENTS

| | | | |
|---|---|---|---|
| 8,040,219 B2 | 10/2011 | Haartsen et al. | |
| 8,370,629 B1* | 2/2013 | Ngo | H04W 4/021 713/168 |
| 8,396,485 B2 | 3/2013 | Grainger et al. | |
| 8,868,104 B2 | 10/2014 | Grainger et al. | |
| 2009/0187983 A1* | 7/2009 | Zerfos | H04L 63/0823 726/10 |
| 2012/0295636 A1 | 11/2012 | Drucker | |
| 2013/0097710 A1 | 4/2013 | Basavapatna et al. | |
| 2013/0328725 A1 | 12/2013 | Wuoti et al. | |
| 2014/0253390 A1 | 9/2014 | Alpert et al. | |
| 2014/0337921 A1* | 11/2014 | Hanna, Jr. | H04L 63/08 726/3 |

(Continued)

FOREIGN PATENT DOCUMENTS

| | | |
|---|---|---|
| EP | 2657719 A1 | 10/2013 |
| WO | 2005096591 A1 | 10/2005 |

(Continued)

OTHER PUBLICATIONS

Pamo et al., "Distributed Detection of Node Replication Attacks in Sensor Networks," IEEE, May 8, 2005, pp. 49-63.

(Continued)

*Primary Examiner* — Shahriar Behnamian
(74) *Attorney, Agent, or Firm* — Shumaker & Sieffert, P.A.

(57) ABSTRACT

A system and method for locating a network device. A location provider determines, based on location data, a location of a wireless access point. The location data includes location data from each of a plurality of network devices, wherein the location data for each network device includes the network device's location and data representative of a distance between the wireless access point and each network device. The location provider generates, based on the location of the wireless access point, location information for the wireless access point, signs the location information with a credential to form signed location information, and communicates the signed location information to the wireless access point.

19 Claims, 12 Drawing Sheets

(56) References Cited

U.S. PATENT DOCUMENTS

| | | | | |
|---|---|---|---|---|
| 2015/0281888 A1* | 10/2015 | Muttik | ................. | H04W 4/021 455/456.1 |
| 2016/0327629 A1* | 11/2016 | Pandharipande | ..... | H04W 4/023 |

FOREIGN PATENT DOCUMENTS

| | | | | |
|---|---|---|---|---|
| WO | 2013033464 A2 | 3/2013 | | |
| WO | WO 2013033464 A2 * | 3/2013 | .............. | H04W 4/06 |
| WO | 2014171967 A1 | 10/2013 | | |

OTHER PUBLICATIONS

Bekara et al., "A New Protocol for Securing Wireless Sensor Networks Against Nodes Replication Attacks," IEEE, Oct. 8, 2007, pp. 59.

International Search Report and Written Opinion of International Application No. PCT/US2016/058151, dated Dec. 21, 2016, 16 pp.

Briggs, "Dynamic Frequency Selection (DFS) and the 5GHz Unlicensed Band," Elliott Laboratories—An NTS Company, Jun. 2010, 11 pp.

Liu, "Survey of Wireless Indoor Positioning Techniques and Systems," IEEE Transactions on Systems, Man, and Cybernetics—Part C: Applications and Reviews, vol. 37, No. 6, Nov. 2007, pp. 1067-1080.

Farid et al., "Recent Advances in Wireless Indoor Localization Techniques and System," Journal of Computer Networks and Communications, Hindawi Publishing Corporation, vol. 2013, Article ID 185138, Aug. 17, 2013, 13 pp.

Gupta, "Google's Approach of a "_NOMAP" Wi-Fi Zone," Infosecurity Magazine Home, http://www.infosecuritymagazine.com/blogs/googlesapproachofanomapwifizone/, Nov. 20, 2011, 2 pp.

Gu et al., "A Survey of Indoor Positioning Systems for Wireless Personal Networks," IEEE Communications Surveys & Tutorials, vol. 11, No. 1, Mar. 4, 2009, pp. 13-32.

* cited by examiner

GENERATING AND PUBLISHING VALIDATED LOCATION INFORMATION

BACKGROUND

Mobile computing device users have become accustomed to determining their location via use of the global positioning system (GPS). GPS is used by a number of smartphone applications to provide location-specific information to the smartphone user. GPS, however, works best outdoors. GPS receivers are less capable of determining location when GPS satellite signals are blocked by buildings in, for instance, a metropolitan area, or when the GPS receiver is indoors. GPS receivers also tend to have high power requirements and have less reliable location information than equivalent Wi-Fi receivers.

Wireless access points can be used to determine the location of mobile computing devices in situations where GPS location service is degraded or where the power consumed by GPS receivers is a concern. Devices connected to wireless access points can compute their location with respect to the locations of the wireless access points around them by, for example, scanning the surrounding Wi-Fi environment and determining the location of the device relative to the detected wireless access points. In some approaches, the device determines its location based on the location and distance of the wireless access points from the device as revealed by the scan. In other approaches, the scan of the surrounding Wi-Fi environment yields a list of access points and their signal strengths. The device may send the list to a service in the cloud where the service may use historical knowledge to determine the location of the device. The service may send, to the device, a response that includes the determined location of the device.

SUMMARY

In some examples, a method comprises determining, by a location provider and based on location data, a location of a wireless access point, the location data including location data from each of a plurality of network devices, wherein the location data for each network device includes the network device's location and data representative of a distance between the wireless access point and each network device; generating, by the location provider and based on the location of the wireless access point, location information for the wireless access point; signing the location information with a credential to form signed location information; and communicating the signed location information to the wireless access point.

In some examples, a location provider comprises a network connection; memory; and one or more processors, wherein each processor is connected to the memory, wherein the processor is configured to: determine, based on location data stored in the memory, a location of a wireless access point, the location data including location data from each of a plurality of network devices, wherein the location data for each network device includes the network device's location and data representative of a distance between the wireless access point and the network device; generate, based on the location determined for the wireless access point, location information for the wireless access point; sign the location information for the wireless access point with a credential to form signed location information; store the signed location information in the memory; and communicate the signed location information to the wireless access point.

In some examples, a system comprises a location provider; a plurality of wireless access points connected to the location provider, wherein the plurality of access points includes a plurality of first wireless access points; and a mobile computing device comprising a wireless interface configured to connect to one or more wireless access points from the plurality of wireless access points, wherein the location provider determines a location for each wireless access point and communicates the location as location information to the corresponding wireless access point, wherein the location information for each of the first wireless access points is signed with a digital signature associated with the location provider, wherein each wireless access point from the plurality of wireless access points wirelessly transmits the location information for that wireless access point, wherein the mobile computing device receives the signed location information transmitted by the first wireless access points and verifies that the signed location information for each first wireless access point was signed by the location provider, wherein first wireless access points with location information verified as having been signed by the location provider are verified first wireless access points, wherein the mobile computing device calculates a distance to each of the verified first wireless access points, and wherein the mobile computing device determines a location of the mobile computing device based on the distance to each of the verified first wireless access points and on the location information received from each of the verified first wireless access points.

In some examples, a method comprises receiving, by a wireless device, respective signed location information from each of a plurality of wireless access points, wherein the respective signed location information includes location information for the corresponding wireless access point, determining, by the wireless device, based on the respective signed location information, whether any of the respective signed location information has been compromised, and determining, by the wireless device and based on the signed location information that is not compromised and on data representative of a distance between the wireless device and each wireless access point with signed location data that has not been compromised, a location of the wireless device.

In some examples, a device comprises memory; a wireless interface; and a processor connected to the memory and to the wireless interface, wherein the processor is configured to store, in memory, signed location information received from each of a plurality of wireless access points and data representative of a distance between the mobile computing device and each wireless access point, the signed location information identifying a location for each wireless access point; review the signed location information to determine if the signed location information of any wireless access points has been compromised; determine, based on the signed location information that is not compromised and on data representative of a distance between the mobile computing device and each wireless access point with signed location data that has not been compromised, a location of the mobile computing device; and store, in memory, the location of the mobile computing device.

The details of one or more examples are set forth in the accompanying drawings and the description below. Other features, objects, and advantages of the disclosure will be apparent from the description and drawings, and from the claims.

DETAILED DESCRIPTION

In general, this disclosure is directed to techniques for determining the location of a mobile computing device in a wireless local area network (WLAN) having wireless access points. The mobile computing device scans the WLAN environment and receives a signal from one or more access points. Each access point signal includes location information detailing the location of the access point transmitting the signal. The device determines its location relative to the access points based on the distance to each of the surrounding access points and on the location information it receives from the access points. In some approaches, the distance to each of the surrounding access points is determined based on received signal strength indication (RSSI). In some approaches, the distance to each of the surrounding access points is determined based on a round trip travel time (RTT) estimate.

A problem with the use of wireless access points to determine location is that location information published by access points may have been spoofed or compromised, compromising the ability of the device to determine its location. The location of an access point may, for instance, have been loaded with incorrect location information, or the access point may have been moved since the last location update. Either way, the mobile computing device may not be able, in these scenarios, to calculate its location accurately. Furthermore, a compromised access point may spoof another access point by transmitting an incorrect identifier, such as the wrong basic service set identification (BSSID), or it may take previously published information and duplicate it elsewhere where it doesn't belong.

To counter this, in some approaches, location information is protected with a digital signature, such as a public key certificate, in order to detect that the location information may have been compromised and to prevent spoofing. In some approaches, location information is protected with security data, such as an identifier of the wireless access point (such as the BSSID of the wireless access point) that should have been transmitting the location information or an update date to detect stale location information, in order to detect that the location information may have been compromised and to prevent spoofing.

In one example approach, wireless access points determine their location by scanning the wireless local area network and submitting, to a location provider, a list of access points and a distance measurement detailing an estimate of the distance to each of the surrounding access points. A location service operating in the cloud receives the list of access points and their associated distance measurements, determines the location of the access point and returns the signed location information to the access point as trusted location information. In one example approach, the signed location information includes a last update indicator used to convey the age of the location information.

Figure 1:
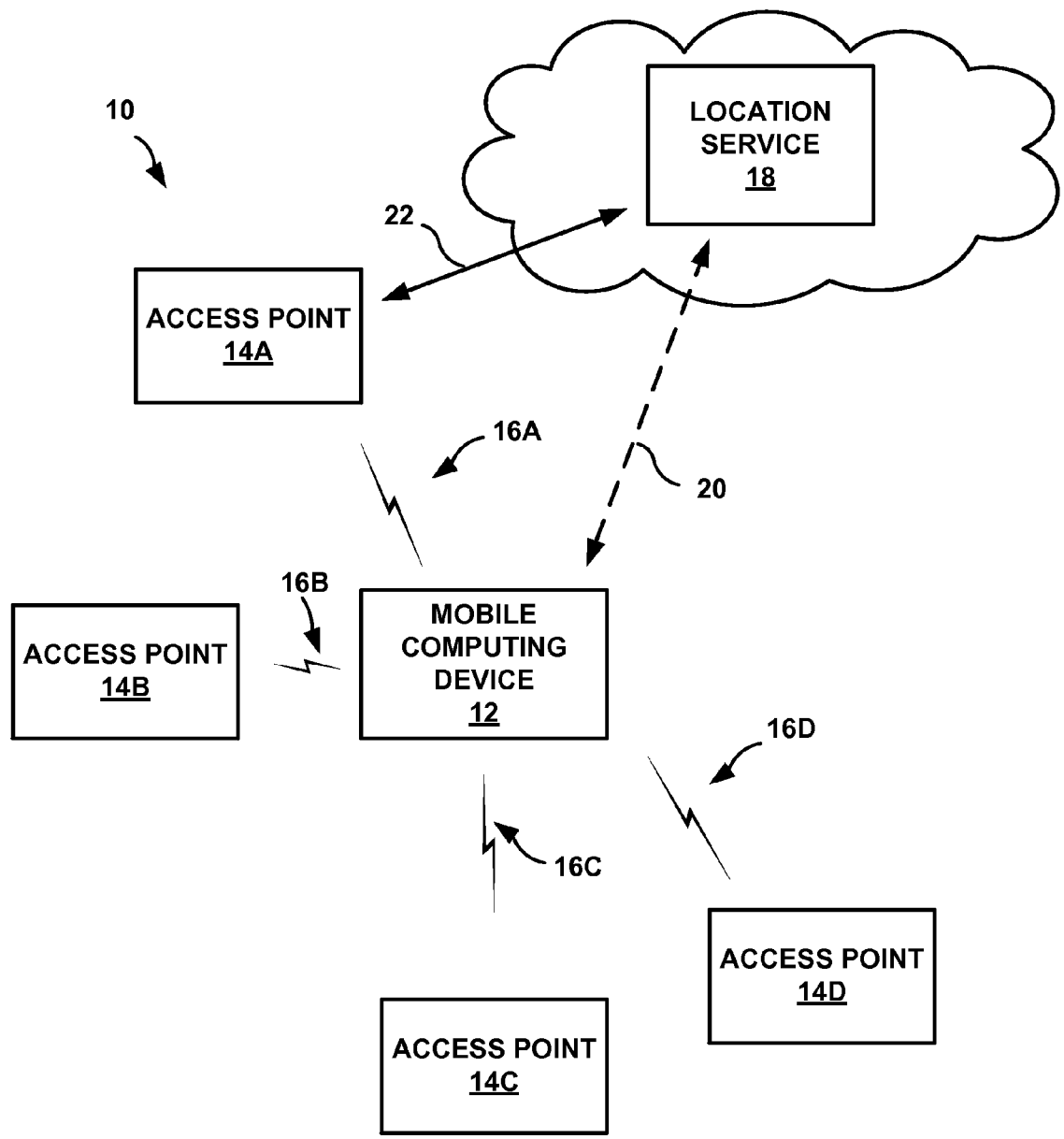
FIG. 1 is a conceptual diagram illustrating an example system in which mobile computing devices determine their location through interaction with wireless access points, in accordance with one or more aspects of the present disclosure.

FIG. 1 is a conceptual diagram illustrating an example system in which mobile computing devices determine their location through interaction with wireless access points, in accordance with one or more aspects of the present disclosure. In the example approach of FIG. 1, system 10 includes a mobile computing device 12 connected via wireless network links 16 to three or more wireless access points 14. One or more access points 14 are also connected via links 22 to a location provider such as cloud-based location service 18. In some example approaches, link 22 includes wired network connections to a location provider such as cloud-based location service 18. In some example approaches, link 22 includes wireless network connections to cloud-based location service 18. Mobile computing device 12 may also be connected through a link 20 to a location provider such as cloud-based location service 18. In one example approach, link 20 includes wireless network connections to cloud-based location service 18 via, for instance, a cellular network.

In some example approaches, mobile computing devices 12 represent individual mobile devices, such as a mobile phone, a tablet computer, a laptop computer, computerized watch, computerized eyewear, computerized gloves, or any other type of portable computing device. Additional examples of mobile computing devices 12 include personal digital assistants (PDA), portable gaming systems, media players, e-book readers, mobile television platforms, automobile navigation and entertainment systems, or any other types of mobile, wearable and non-wearable computing devices configured to receive information via a network, such as network 16.

In operation, mobile computing device 12 may determine a location based on location information received from wireless access points 14, while wireless access points 14 may receive location information from location service 18. In one example approach, location service 18 may determine, based on location data, a location of each wireless access point 14 and may transmit the location to each of the wireless access points 14 as location information. In one such approach, the location data includes location data from each of a plurality of network devices, wherein the location data for each network device includes the network device's location and data representative of a distance between the wireless access point and each network device.

In one example approach, location service 18 may generate, based on the location of each wireless access point 14, location information for the wireless access point 14, may sign the location information with a credential to form signed location information and may communicate the signed location information to wireless access point 14. The credential may be a public or private key, a public-key certificate issued by a trusted certification authority, an electronic signature, a digital signature, or any other mechanism for encrypting the location information, verifying the source of the location information, or encrypting and verifying the source of the location information.

For one or more first wireless access points 14, the location information may include security data which, when verified, indicates the respective location information can be trusted. In one such example approach, each first wireless access point 14 from the plurality of wireless access points 14 may transmit, to the mobile computing device 12, signed location information for that wireless access point 14. In such an approach, mobile computing device 12 may verify each first wireless access point 14 based on the digital signature of the signed location information, may calculate a distance to each of the verified first wireless access points 14, and may determine the location of the mobile computing device 12 based on the signed location information received from each of the verified first wireless access points 14 and on the distance to each of the verified first wireless access points 14.

In some example approaches, a plurality of wireless access points 14 may further include one or more second wireless access points. The location provider may determine a location of each second wireless access point 14 and may transmit that location to each of the corresponding second wireless access points as unsigned location information. Each second wireless access point 14 may transmit, to mobile computing device 12, the unsigned location information for that second wireless access point 14. Mobile computing device 12 may calculate a distance to each of the second wireless access points and may determine the location of the mobile computing device based on the signed location information received from each of the verified first wireless access points, the unsigned location information received from each of the second wireless access points, the distance to each of the verified first wireless access points, and the distance to each of the second wireless access points.

In one approach, wireless access points 14 may publish their location in their beacon signal or in response to probes from mobile computing devices 12. Mobile computing device 12 may use the location information received from access points 14 to determine a current location of mobile computing device 12. For example, mobile computing device 12 may determine the distance to each access point 14 based on respective received signal strength indication (RSSI) estimates received from each access point 14.

Mobile computing device 12 may use the location information published by the nearby access points 14, in combination with the respective RSSI estimates, to determine its location. In some such approaches, device 12 may communicate its calculated location to cloud-based location service 18 for location verification as will be detailed below.

As noted above, in some approaches, mobile computing device 12 may compute a distance to each of the surrounding access points based on RSSI. In other approaches, mobile computing device 12 may compute a distance to each of the surrounding access points based on a round trip travel time (RTT) estimate. In some approaches, as noted above, location information is protected with a digital signature, such as a public key certificate, in order to detect when the location information may have been compromised and to prevent spoofing. In some approaches, mobile computing device 12 may use a source identifier embedded in signed location information to verify that the source identifier of the transmitting access point 14 matches the source identifier embedded in the signed location information. In some such approaches, the source identifier may include as a basic service set identification (BSSID) and mobile computing device 12 may verify that the BSSID in the signed location information received from a wireless access point matches the BSSID identifying the wireless access point.

In order to be able to transmit location information, the wireless access points in some example approaches determine their own location via a location provider. In some approaches the location provider is a cloud-based service, such as location service 18. In some such approaches, wireless access points 14 may communicate with surrounding wireless access points to determine distances to the surrounding wireless access points 14. Wireless access points 14 may then transmit a list of the surrounding wireless access points and the distances (measure via, for instance, RSSI or RTT) to the surrounding wireless access points 14 to cloud-based location service 18. Cloud-based location service 18 may determine the location of the access point and may transmit a signed copy of the location information to the requesting access point. The wireless access point 14 then transmits the location information either in response to a request by a mobile computing device 12 or as part of its beacon signal so that the location information can be used by mobile computing device 12 to determine the location of mobile computing device 12.

In one example approach, system 10 may limit spoofing by attaching security data to the location information transmitted by the access point. If a security check by mobile computing device 12 based on the security data fails, mobile computing device 12 may assume that the access point location is compromised. In another example approach, the location information includes a digital signature used by mobile computing device 12 to determine if the information is trustworthy.

Each wireless access point 14 may receive the location information for that wireless access point and may transmit the location information as a beacon signal transmission to mobile computing devices 12. In one example approach, each mobile computing device 12 may receive the location information transmitted by the wireless access points 14, may verify location information identified as trusted location information using the security data, and may determine the location of that mobile computing device based on the trusted location information received from each of the plurality of wireless access points. In one such example approach, the location of the mobile computing device takes into account knowledge of the mobile device location obtained from prior knowledge or from other sources.

In one example approach, each mobile computing device 12 may receive the location information transmitted by the wireless access points 14, may verify location information identified as trusted location information using the security data, may calculate a distance to each of the plurality of wireless access points based on the trusted location information and may determine the location of that mobile computing device based on the trusted location information received from each of the plurality of wireless access points and the distance to each of the plurality of wireless access points.

Figure 2:
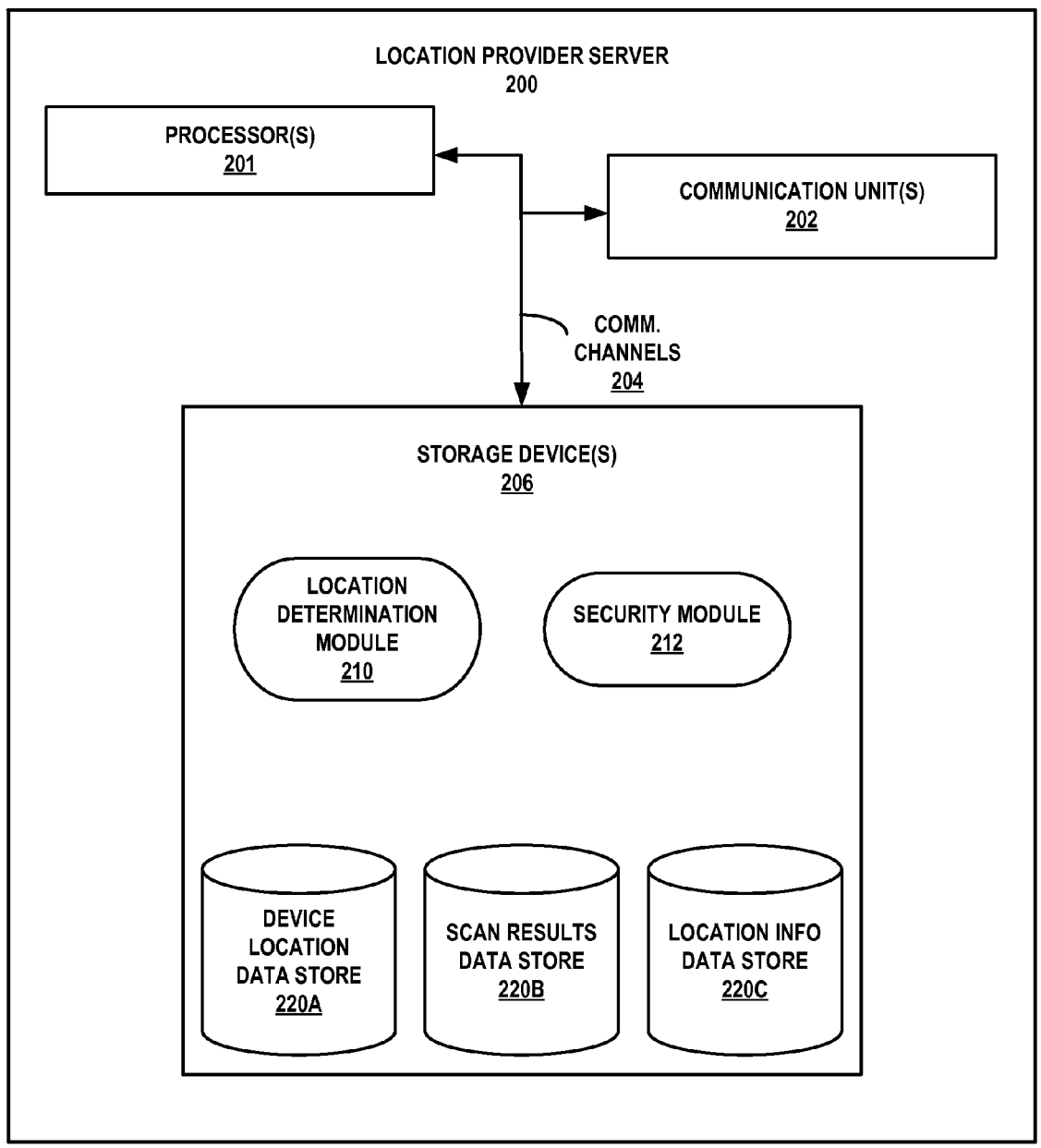
FIG. 2 is a block diagram illustrating an example location provider, in accordance with one or more aspects of the present disclosure.

FIG. 2 is a block diagram illustrating an example location provider, in accordance with one or more aspects of the present disclosure. In the example shown in FIG. 2, a location provider server 200 hosts location service 18. In one example approach, location provider server 200 includes one or more processors 201 connected across a communications channel 204 to one or more communication units 202 and to one or more storage devices 206.

Location provider server 200 illustrates one example implementation of location service 18 of FIG. 1 and is described below within the context of system 10 of FIG. 1. FIG. 2 illustrates only one particular example of a location provider, and other examples of a location provider such as location service 18 may be used in other instances and may include a subset of the components included in example location provider server 200 or may include additional components not shown in FIG. 2.

Location provider server 200 may provide wireless access points 14 with a mechanism for determining their location, and for verifying the location of a mobile computing device 12 against other locations computed by the location provider. As shown in the example of FIG. 2, storage devices 206 of location provider server 200 include location determination module 210 and security module 212.

Storage devices 206 of location provider server 200 further include device location data store 220A, scan results data store 220B, and location information data store 220C (collectively, "data stores 220"). Communication channels 204 may interconnect each of the components 200, 202, and 206 for inter-component communications (physically, communicatively, and/or operatively). In some examples, communication channels 204 may include a system bus, a network connection, an inter-process communication data structure, or any other technique for communicating data.

One or more communication units 202 of location provider server 200 may communicate with external network devices, such as mobile computing devices 12 and wireless access points 14 of FIG. 1, by transmitting and/or receiving network signals on one or more networks, via network links such as links 16, 20 and 22 of FIG. 1. For example, location provider server 200 may use communication unit 202 to transmit and/or receive radio signals across link 20 to exchange information with mobile computing devices 12. Examples of communication unit 202 include a network interface card (e.g. such as an Ethernet card), an optical transceiver, a radio frequency transceiver, a GPS receiver, or any other type of device that can send and/or receive information. Other examples of communication units 202 may include wired networks, wireless networks, short wave radios, cellular data radios, wireless Ethernet network radios, as well as universal serial bus (USB) controllers.

One or more storage devices 206 within location provider server 200 may store information for processing during operation of location provider server 200 (e.g., location service 18 may store data accessed by modules 210 and 212 during execution at location provider server 200). In some examples, storage devices 206 are a temporary memory, meaning that a primary purpose of storage devices 206 is not long-term storage. Storage devices 206 on location provider server 200 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 206, in some examples, also include one or more computer-readable storage media. Storage devices 206 may be configured to store larger amounts of information than volatile memory. Storage devices 206 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 206 may store program instructions and/or data associated with modules 210 and 212.

One or more processors 201 may implement functionality and/or execute instructions within location provider server 200. For example, processors 201 on location provider server 200 may receive and execute instructions stored by storage devices 206 that execute the functionality of modules 210 and 212. These instructions executed by processors 201 may cause location provider server 200 to store information, within storage devices 206 during program execution. Processors 201 may execute instructions of modules 210 and 212 to determine the location of access points 14 and mobile computing devices 12. That is, modules 210 and 212 may be operable by processors 201 to perform various actions or functions of location provider server 200 which are described herein.

Storage devices 206 represent any suitable storage medium for storing information related to determining the location of wireless access points 14 and mobile computing devices 12. The information stored at storage devices 206 may be searchable and/or categorized such that one or more modules 210 and 212 may provide an input requesting information from one or more of storage devices 206 and, in response to the input, receive information stored within storage devices 206.

In some example approaches, device location data store 220A includes device location information as determined by processors 201 executing location determination module 210. In some such approaches, an unsigned version of the location information determined for network devices such as mobile computing device 12 and wireless access point 14 may be primarily maintained in device location data store 220A for internal access by processors 201.

In some example approaches, scan results presented to location provider server 200 by network devices such as, for instance, wireless access points 14 and mobile computing devices 12 are stored in scan results data store 220B and are used to detect anomalies between those scans and the scans submitted by other wireless access points 14. Finally, location information such as signed triples or tuples is stored in location information data store 220C.

In some examples, location determination module 210 determines the location of each wireless access point from the scanned information provided by a wireless access point 14 and transmits the location to the corresponding wireless access point as location information. In some such examples, the location information includes security data identifying the location information as signed location information. Each wireless access point 14 receives the location information for that wireless access point and transmits the location information as a wireless transmission to the mobile computing devices 12. In some example approaches, the wireless access point verifies location information received from the expected location service 18 before accepting new location information.

In some examples, security module 212 checks to see that the scanned information received from a wireless access point 14 is consistent with information received from other wireless access points 14 and, in some cases, with location information provided by mobile computing devices 12, as stored in device location data store 220A and scan results data store 220B.

In some examples, security module 212 may sign location information to form signed location information before transmitting the signed location information to a wireless access point 14. The location information may, for instance, be signed using the public key of location service 18.

Figure 3:
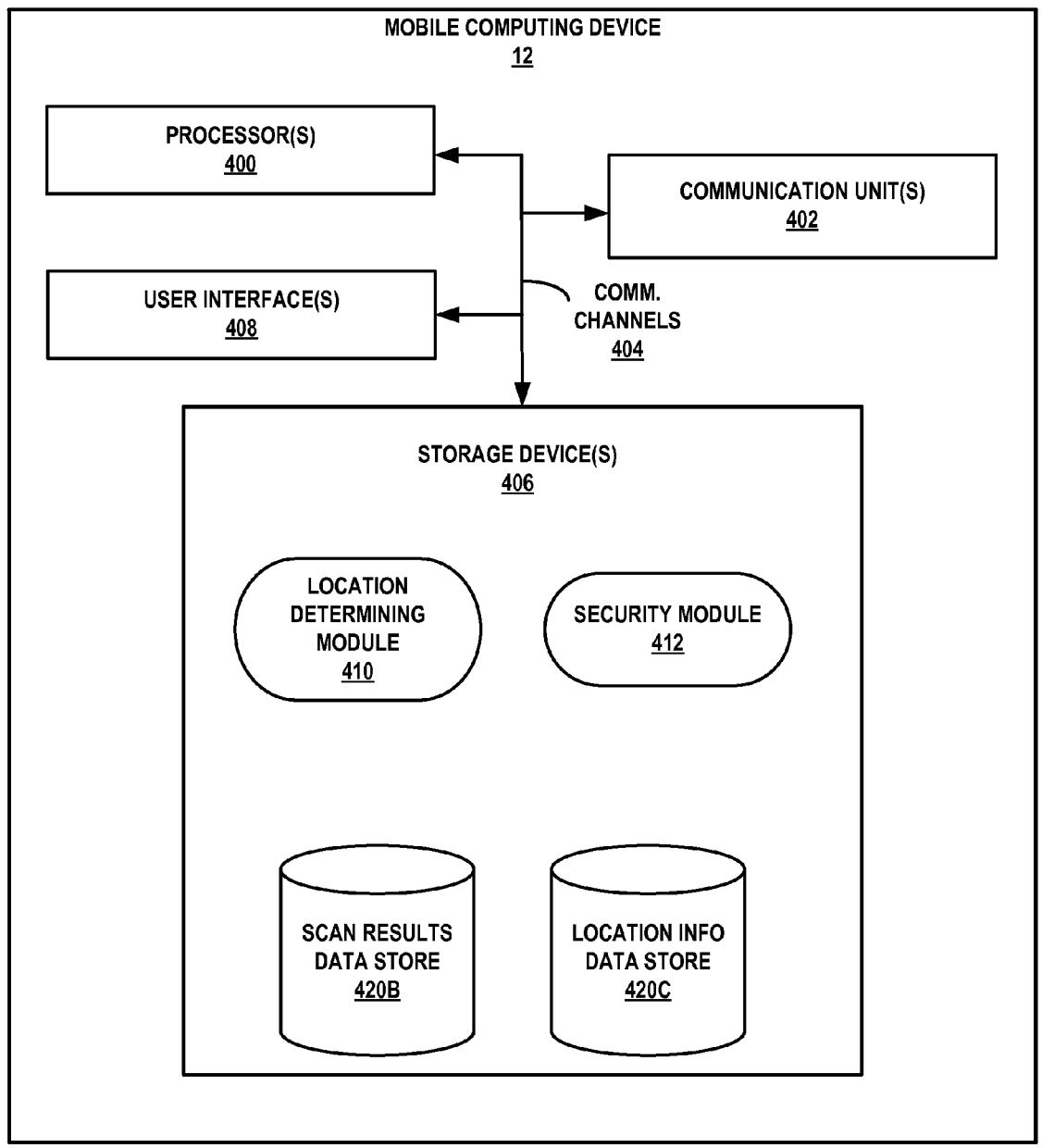
FIG. 3 is a block diagram illustrating an example mobile computing device, in accordance with one or more aspects of the present disclosure.

FIG. 3 is a block diagram illustrating an example mobile computing device 12, in accordance with one or more aspects of the present disclosure. The mobile computing device of FIG. 3 is a more detailed example of mobile computing device 12 of FIG. 1 and is described below within the context of system 10 of FIG. 1. FIG. 3 illustrates only one particular example of mobile computing device 12, and many other examples of mobile computing device 12 may be used; some may include a subset of the components included in example mobile computing device 12 or may include additional components not shown in FIG. 3. In the example shown in FIG. 3, mobile computing device 12 includes one or more processors 400 connected across a communications channel 404 to one or more communication units 402, to one or more user interfaces 408 and to one or more storage devices 406.

In one example, mobile computing device 12 receives location information detailing the locations of the wireless access points 14, determines the location of the mobile wireless device, and verifies the computed location against other locations computed by the location service 18. As shown in the example of FIG. 3, storage devices 406 of mobile computing device 12 include a location determination module 410 and a security module 412.

Storage devices 406 of location provider server 200 further include scan results data store 420B and location information data store 420C (collectively, "data stores 420"). Communication channels 404 may interconnect each of the components 400, 402, and 406 for inter-component communications (physically, communicatively, and/or operatively). In some examples, communication channels 404 may include a system bus, a network connection, an inter-process communication data structure, or any other method for communicating data.

One or more communication units 402 of mobile computing device 12 may communicate with external network devices, such as location service 18 (using, for instance, link 20) and wireless access points 14 (using, for instance, links 16) of FIG. 1, by transmitting and/or receiving network signals on one or more networks (shown as links 16 and 20 in FIG. 1). For example, mobile computing device 12 may use communication unit 202 to transmit and/or receive radio signals across link 20 to exchange information with location service 18. Examples of communication unit 402 include a network interface card (e.g. such as an Ethernet card), an optical transceiver, a radio frequency transceiver, a GPS receiver, or any other type of device that can send and/or receive information. Other examples of communication units 402 may include wired networks, wireless networks, short wave radios, cellular data radios, wireless Ethernet network radios, as well as universal serial bus (USB) controllers.

One or more storage devices 406 within mobile computing device 12 may store information for processing during operation of mobile computing device 12 (mobile computing device 12 may, for example, store within storage device 406 data accessed by software shown as modules 410 and 412 during execution at mobile computing device 12). In some examples, storage devices 406 are a temporary memory, meaning that a primary purpose of storage devices 406 is not long-term storage. Storage devices 406 on mobile computing device 12 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 406, in some examples, also include one or more computer-readable storage media. Storage devices 406 may be configured to store larger amounts of information than volatile memory. Storage devices 406 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 406 may store program instructions and/or data associated with modules 410 and 412.

One or more processors 400 may implement functionality and/or execute instructions within mobile computing device 12. For example, processors 400 on mobile computing device 12 may receive and execute instructions stored by storage devices 406 that execute the functionality of modules 410 and 412. These instructions executed by processors 400 may cause mobile computing device 12 to store information, within storage devices 406 during program execution. Processors 400 may execute instructions of modules 410 and 412 to determine the location of mobile computing device 12. That is, modules 410 and 412 may be operable by processors 400 to perform various actions or functions of mobile computing device 12 which are described herein.

Data stores 406 represent any suitable storage medium for storing information related to determining the location of mobile computing device 12. The information stored at data stores 406 may be searchable and/or categorized such that one or more modules 410 and 412 may provide an input requesting information from one or more of data stores 406 and in response to the input, receive information stored at data stores 406.

In some example approaches, scan results received from wireless access points 14 are stored in scan results data store 420B and used to determine the location of mobile computing device 12. In some such example approaches, previous scan results may be compared to newly obtained scan results to determine if the newly obtained scan results are consistent with the previous scan results. In some example approaches, the scan results include the wireless access point's location and a measurement of distance to the wireless access point.

In some such example approaches, the distance measurement is a function of RSSI while, in other example approaches, the distance measurement is a function of RTT.

In some examples, the location information received from wireless access points 14 includes security data securing aspects of the location information.

In some example approaches, location information data store 420C includes location information as determined by processors 400 executing location determination module 410. In some examples, location determination module 410 determines the location of mobile computing device 12 based on the location information received from the wireless access points 14 and the distance to the wireless access points and stores the location in location information data store 420C.

In some examples, security module 412 verifies that location information received from a wireless access point 14 is from a trusted location service 18. In some such examples, this includes verifying that the location information is signed by the expected trusted location provider. In some examples, security module 412 checks that the location information is up to date. In some such examples, security module 412 also checks that the location information is from the expected wireless access point 14.

In some examples, security module 412 communicates with location service 18 to transmit its latest location to location service 18. In some such examples, location service 18 receives the location and checks it to determine if the location is consistent with other information it has received from wireless access points 14 and other mobile computing devices 12.

Figure 4:
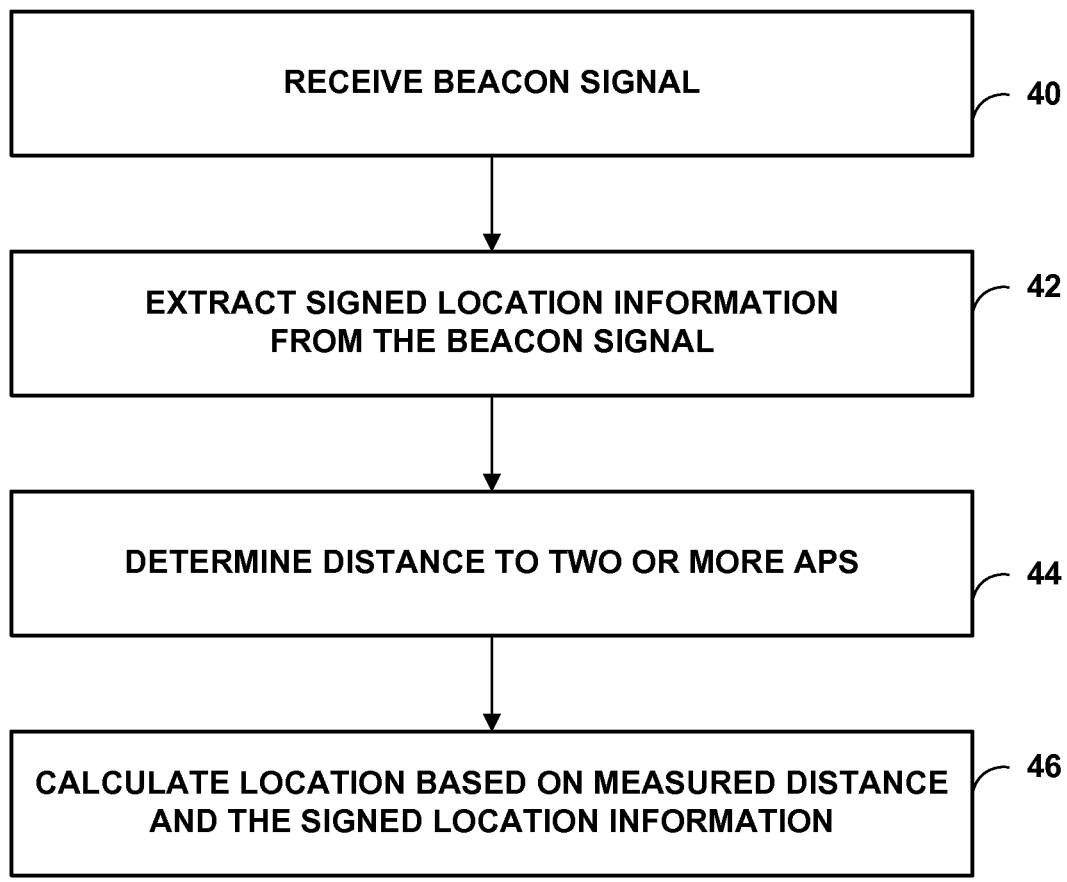
FIG. 4 is a flow chart illustrating an example process for determining a device location via access point location information.

FIG. 4 is a flow chart illustrating an example process for determining a device location via wireless access point location information. FIG. 4 is described below in the context of system 10 of FIG. 1. For example, mobile computing device 12 may perform operations 40-46 for determining the location of mobile computing device 12, in accordance with one or more aspects of the present disclosure.

In the example shown in FIG. 4, mobile computing device 12 receives a beacon signal from each of the wireless access points 14. (40) Mobile computing device 12 extracts signed location information from each of the beacon signals (42) and uses the signed location information from each wireless access point to identify the location of that wireless access point. Mobile computing device 12 calculates the distance to two or more of the access points 14 that provided signed location information (44) and calculates its location as a function of the location of, and distance to, each wireless access point 14. (46)

In some example approaches, mobile computing devices 12 may review the location information to determine if the location information is from a trusted location service 18. In some examples, determining if the location information is from a trusted location service 18 includes verifying that the location information is signed by the expected trusted location provider.

In an alternate example, each mobile computing device 12 probes its neighboring access points 14 and receives a response containing signed location information identifying the location of the transmitting access point 14. Mobile computing device 12 extracts location information from the response and calculates the distance to each access point 14 that provided signed location information. Both are then used to calculate the location of mobile computing device 12. Once again, in some such example approaches, mobile computing devices 12 review the location information to determine if the location information is from a trusted location service 18 such as is detailed above.

In some example approaches, security module 412 makes a check to determine if the location information is up to date. In one such example approach, each beacon signal includes an indication of the last time the location information of wireless access point 14 was updated. In one example approach, location information is treated as trusted if digitally signed and updated within a predefined period of time.

In some example approaches, security module 412 makes a check to determine if the location information is from the expected wireless access point 14. In one such example approach, each beacon signal includes an identifier associated with an access point. In one such approach, the identifier is the BSSID of wireless access point 14.

It is possible to compensate for the occasional lack of network connectivity to cloud-based location services 18 by maintaining a cache of historical knowledge on access point locations. In one example approach, the historical knowledge is maintained in the cloud to allow offline access to that data.

In one example approach, the locations of wireless access points 14 and mobile computing devices 12 may be calculated based on trusted location information only, on a combination of trusted location information and information received from wireless access points 14 that do not provide trusted location information, on a combination of trusted location information and historical location information stored on the wireless access point 14 or mobile computing device 12 whose location is being determined, or on a combination of trusted location information, untrusted location information and historical location information.

In one example approach, mobile computing device 12 maintains a table of historical location information indexed by BSSID. The table of historical location information may be used to obtain the location of a wireless access point 14 when, for example, signed location information is not available from the wireless access point. To address this issue, in one example approach, as will be discussed in more detail below, a mobile computing device 12 may cache historical knowledge and, instead of matching a location, may use the BSSID to identify the location based on historical location information. In one approach, mobile computing device 12 triggers location-based reminders when triangulation performed by a wireless chipset of mobile computing device 12 places device 12 at a certain (lat, long) combination. This eliminates the need to look for specific BSSIDs at specific channels and allows for more precise identification of a geofence.

Figure 5A:
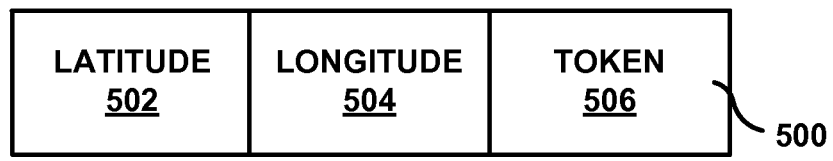
FIG. 5A illustrates an example (lat, long, token) tuple, in accordance with one or more aspects of the present disclosure.

FIG. 5A illustrates an example (lat, long, token) tuple 500, in accordance with one or more aspects of the present disclosure. As noted above, location information is either transmitted by each wireless access point 14 as a beacon signal, or transmitted by each wireless access point 14 in response to a probe by the mobile computing device 12. In the example shown in FIG. 5A, the location information is transmitted as a triple 500 that includes a latitude 502, a longitude 504 and a token 506. Token 506, in some examples, may include descriptive information used by mobile computing device 12 to display its location within a context. For instance, token 506 may include text such as "$4^{th}$ floor parking garage" that, when received by mobile computing device 12, is used to label a map showing the location of mobile computing device 12. Token 506 may, in other example approaches, include security data, such as a source identifier or a last update indicator.

A wireless access point can lie about its location, throwing off the calculations by device 12 of its own location. To prevent this, system 10 implements "trusted location providers." The idea behind trusted location providers is that location information published by an access point can be signed by a trusted location provider—generally the entity that produced the (lat, long, token) triplet—and that signature can be verified by devices 12. If a device 12 trusts that location provider, then location information from that trusted location provider can be used by that device for whatever purpose it chooses.

In one example approach, location service 18 provides a signature with the (lat, long, token) triplet. In one such approach, the signature is a public key certificate, but other certification techniques can be used as well. A trusted location provider may be provisioned on a device 200 by simply installing a public certificate on the device. Keys available in that certificate are then used to verify that the location information was indeed generated by that particular location provider, and that it has not been tampered with.

To prevent location attacks like spoofing, the location triplet may be expanded to include items such as the expected BSSID of access point 14 and the time of the last update to the signed location information. To make the information more reliable, in one example approach, location information is refreshed periodically (for instance, once a week or once a day). In some such approaches, devices 12 may include a policy of only choosing information that is relatively fresh, thus avoiding problems arising from relying on stale data.

Figure 5B:
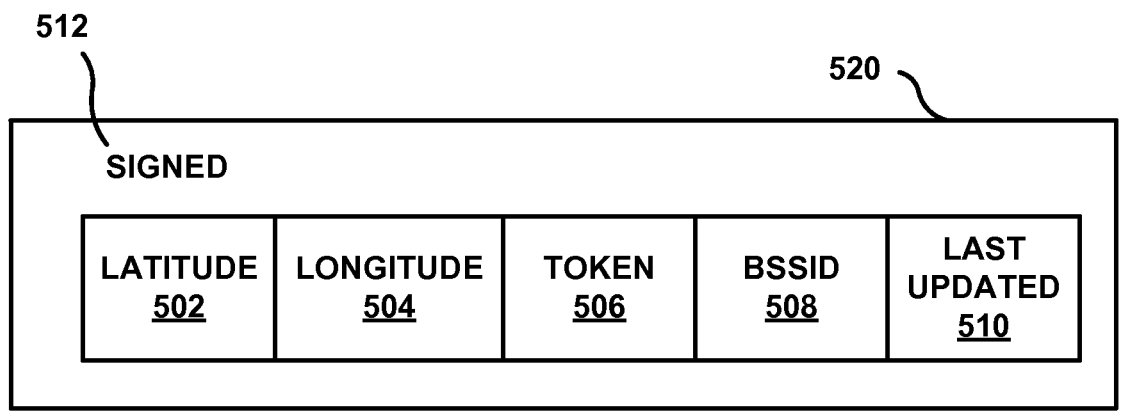
FIG. 5B illustrates an example signed (lat, long, token, basic service set identification (BSSID)) tuple, in accordance with one or more aspects of the present disclosure.

FIG. 5B illustrates an example signed (lat, long, token, BSSID, last update) tuple, in accordance with one or more aspects of the present disclosure. In the example shown in FIG. 5B, the location information is transmitted as a tuple 520 that includes a latitude 502, a longitude 504, a token 506, a source identifier 508 and a last update 510. In the example shown in FIG. 5B, source identifier 508 is the expected BSSID of the wireless access point that is supposed to have transmitted the location information. A mobile computing device 12 receives tuple 520, verifies, via the signature, that the tuple 520 is from the expected trusted location service 18 and then verifies that tuple 520 is from the wireless access point that transmitted tuple 520 (i.e., that it has a BSSID that matches the BSSID in tuple 520. In some example approaches, trusted provider 18 signs tuple 520 with a public key 512.

As noted above in reference to FIG. 5A, token 506, in some examples, includes descriptive information used by mobile computing device 12 to display its location within a context. For instance, token 506 may include text such as "4$^{th}$ floor parking garage" that, when received by mobile computing device 12, is used to label a map showing the location of mobile computing device 12.

Figure 6:
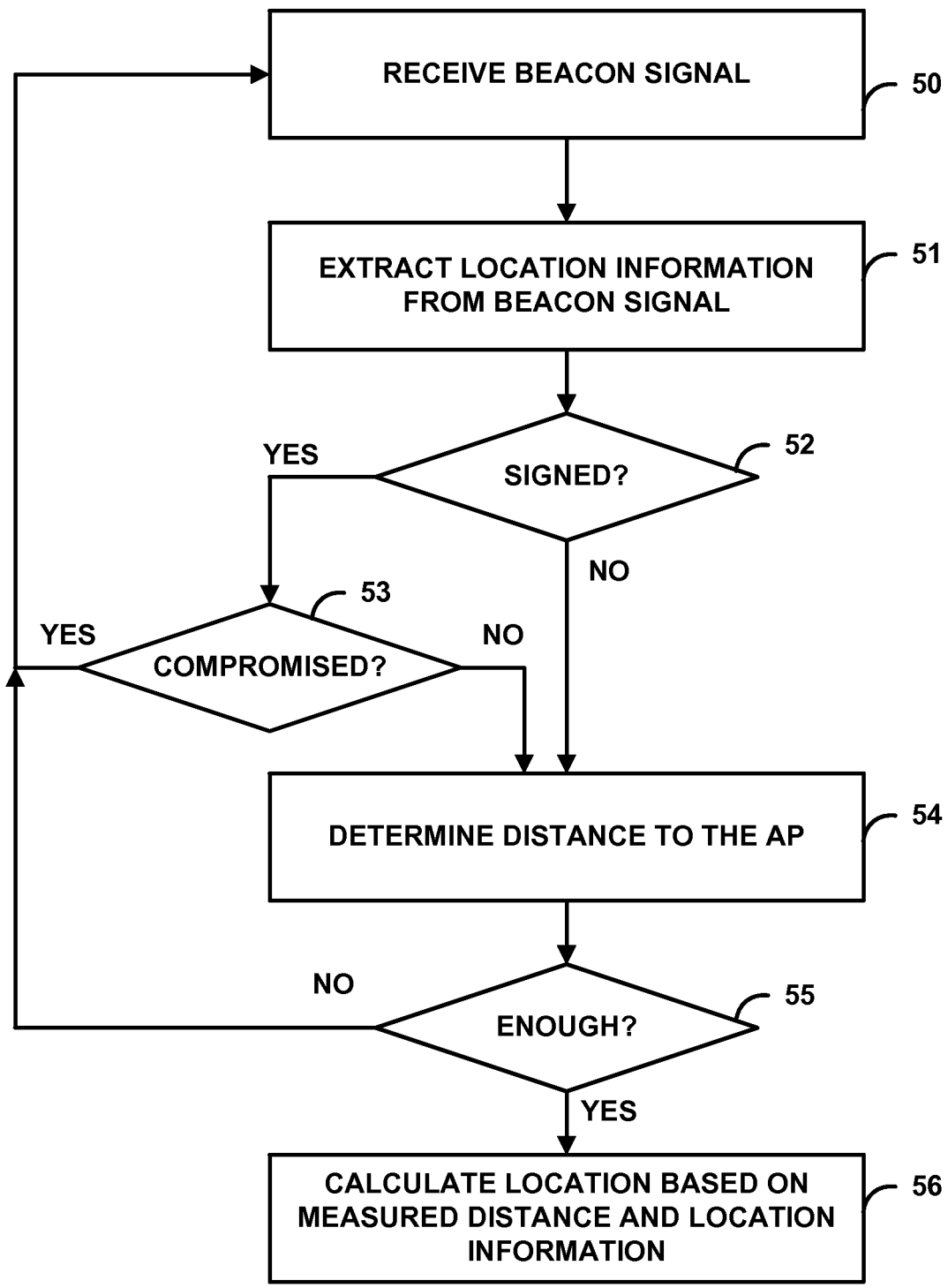
FIG. 6 is a flow chart illustrating an example process for determining a device location via access point location information.

FIG. 6 is a flow chart illustrating an example process for determining a device location via wireless access point location information. FIG. 6 is described below in the context of system 10 of FIG. 1. For example, a wireless device, such as a wireless access point 14 or a mobile computing device 12, may perform operations 50-56 for determining the location of the wireless device, in accordance with one or more aspects of the present disclosure. In one example approach, a wireless device receives respective signed location information from each of a plurality of wireless access points 14, wherein the respective signed location information includes location information for the corresponding wireless access point. The wireless device determines, based on the respective signed location information, whether any of the respective signed location information has been compromised and determines, based on the signed location information that is not compromised and on data representative of a distance between the wireless device and each wireless access point with signed location data that has not been compromised, a location of the wireless device.

In the example shown in FIG. 6, mobile computing device 12 receives a beacon signal from each of the wireless access points 14. (50) Location information is extracted from each of the beacon signals. (51) The information from each wireless access point identifies the location of that wireless access point. The location information may be signed or unsigned.

At 52, a check is made to determine if the location information received from particular wireless access points 14 is signed or unsigned. If signed, a check is made at 53 to determine if the signed location information was compromised. In some approaches, signed location information is compromised if the digital signature does not match the expected location provider, or if the signed location information includes security data that raises a security concern. In some approaches, the signed location information includes the expected BSSID of the wireless access point transmitting the signed location information. A check is made at 53 to determine if the expected BSSID matches the BSSID of the wireless access point 14. If not, the signed location information is compromised. If the signed location information is compromised, the trusted information may be discarded and control may move to 50 as device 12 waits for another set of location information.

In some approaches, signed location information is compromised if, for instance, a check at 53 indicates that the update time is too old. If so, the signed location information is compromised, the trusted information is discarded and control moves to 50 as device 12 waits for another set of location information.

If, at 52, the location information is unsigned or, at 53, the signed location information has not been compromised, control moves to 54 and the distance to each access point 14 is calculated (54). A check is made at 55 to determine if device 12 has received location information from enough wireless access points 14 to calculate a location and, if not, control moves to 50 as device 12 waits for another set of location information.

If, at 55, device 12 determines that the location information accumulated is sufficient to calculate the location of mobile computing device 12, control moves to 56 and device 12 calculates the location of mobile computing device 12. In some example approaches, each mobile computing device 12 determines, based on the location information received from each of the wireless access points and on data representative of a distance between the mobile computing device and each wireless access point, the location of mobile computing device 12.

In some example approaches, both signed and unsigned location information is used to calculate the location of device 12. In some such approaches, preference is given to the information received via signed location information.

In an alternate example, each mobile computing device 12 probes its neighboring access points 14 and receives a response containing location information identifying the location of the transmitting access point 14. Location information is extracted from the response and the distance to each access point 14 is calculated. Both are then used to calculate the location of mobile computing device 12. Once again, in some such example approaches, mobile computing devices 12 review the location information to determine if the location information is from a trusted location service 18 such as is detailed above.

In some examples, a check is made by security module 412 that the location information is up to date. In some examples, a check is made by security module 412 that the location information is from the expected wireless access point 14.

Figure 7:
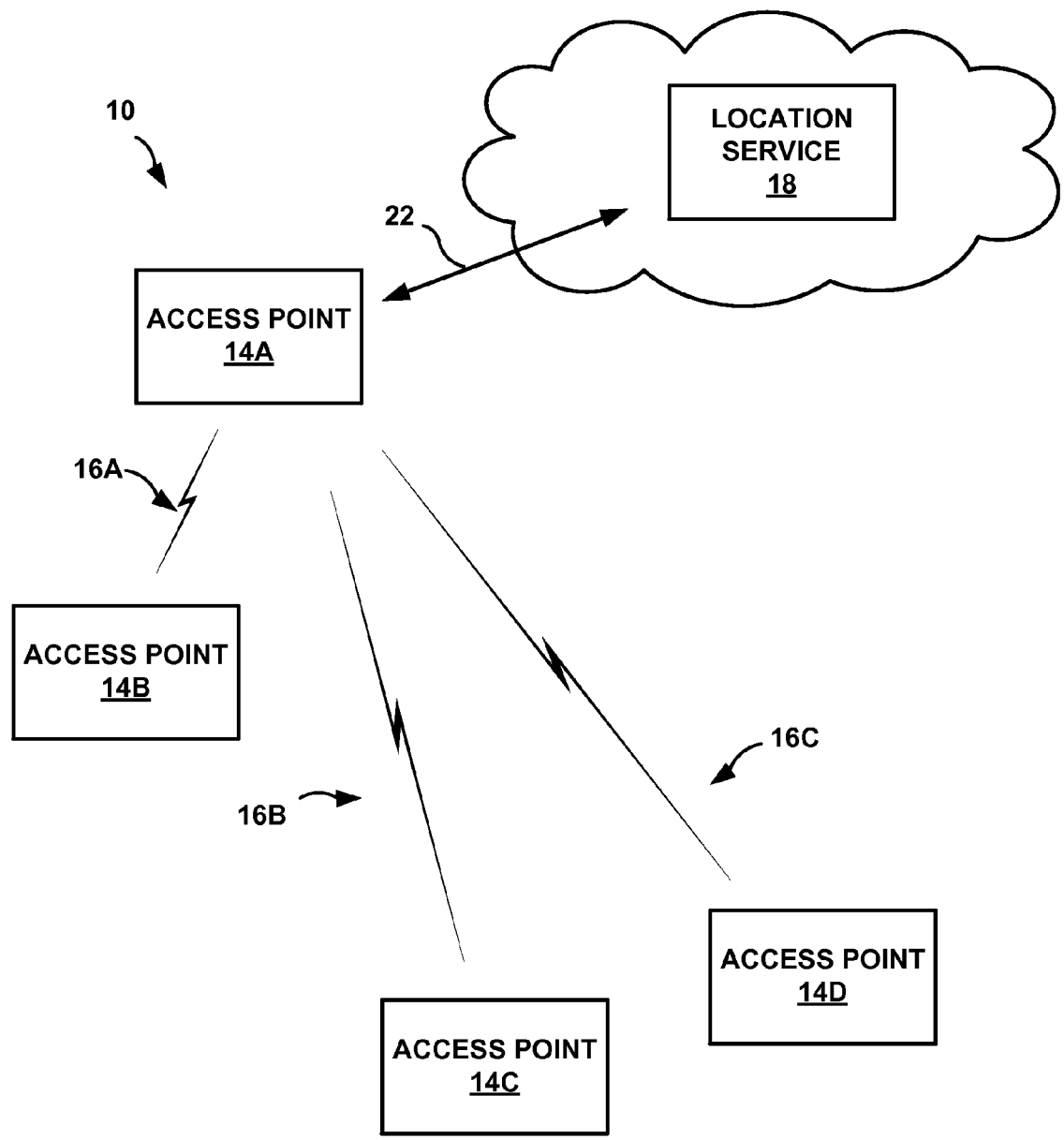
FIG. 7 is a conceptual diagram illustrating an example system in which access points determine their location through interaction with other network devices, in accordance with one or more aspects of the present disclosure.

FIG. 7 is a conceptual diagram illustrating an example system in which access points determine their location through interaction with other network devices, in accordance with one or more aspects of the present disclosure. In one example approach, wireless access points 14 publish their location in their beacon signal, or in response to probes from mobile computing devices 12 or from other access points 14. In the example approach of FIG. 7, an access point 14 scans its neighborhood, either listening for the beacon signal or probing the other wireless access points 14. The scan of the surrounding Wi-Fi environment yields a list of other access points 14 and their signal strengths. That list is sent to location service 18.

In the example approach of FIG. 7, system 10 includes four or more wireless success points 14 connected via links 16 of a Wi-Fi network. Once one or more of the wireless access points 14 are connected via network link 22 to the location provider. In some such example approaches, the location provider is a cloud-based location service 18.

In one example approach, access points 14 publish their location in their beacon signal, or in response to probes from mobile computing devices 12. A wireless access point 14 may determine its location using the location information received from other access points 14 and, in some cases, from information received from other network devices (such as mobile computing devices 12), along with a measurement of distance to each of the other network devices. In one such approach, the distance to each access point is determined based on received signal strength indication (RSSI) estimates. Wireless access point 14 receives the location information published by the nearby access points 14, and transmits that information with the received signal strength indication (RSSI) estimates to location service 18 so that location service 18 can determine the location of the wireless access point.

In one example approach, each wireless access point 14 transmits an access point signal. The access point signal includes location information detailing the location of the access point transmitting the signal. The device determines its location based on the distance to each of the surrounding access points and on the location information it receives from the access points.

In some approaches, the distance to each of the surrounding access points is determined based on received signal strength indication (RSSI). In other approaches, the distance to each of the surrounding access points is determined based on a round trip travel time (RTT) estimate. In some approaches, location information is protected with a digital signature, such as a public key certificate, in order to detect when the location information may have been compromised and to prevent spoofing. In some approaches, an access point identifier such as the basic service set identification (BSSID) of the access point is embedded in the signed location information and is used to verify that the with transmitting access point 14 has a BSSID that matches the BSSID in the location information.

In some approaches, the location provider is a cloud-based service, such as location service 18 in FIG. 1. In such approaches, the wireless access points communicate with surrounding access points to determine distances to the wireless access points. They then transmit a list of the surrounding access points and their distances (via RSSI or RTT) to a cloud-based location service 18. The cloud-based location service determines the location of the access point and transmits a signed copy of the location information to the requesting access point. The access point then transmits the location information either in response to a request by a mobile computing device 12 or as part of its beacon signal so that the location information can be used by the mobile computing device 12 to determine its location.

In one example approach, the system limits spoofing by attaching security data to the location information transmitted by the access point. If a security check based on the security data fails, the mobile computing device assumes that the access point location is compromised. In another example approach, the location information includes a signature used to determine if the information is from trustworthy location provider.

In one example approach, location service 18 determines the location of each wireless access point 14 and transmits the location to the corresponding wireless access point as location information. For some wireless access points, the location information includes security data identifying the location information as trusted location information.

Figure 8:
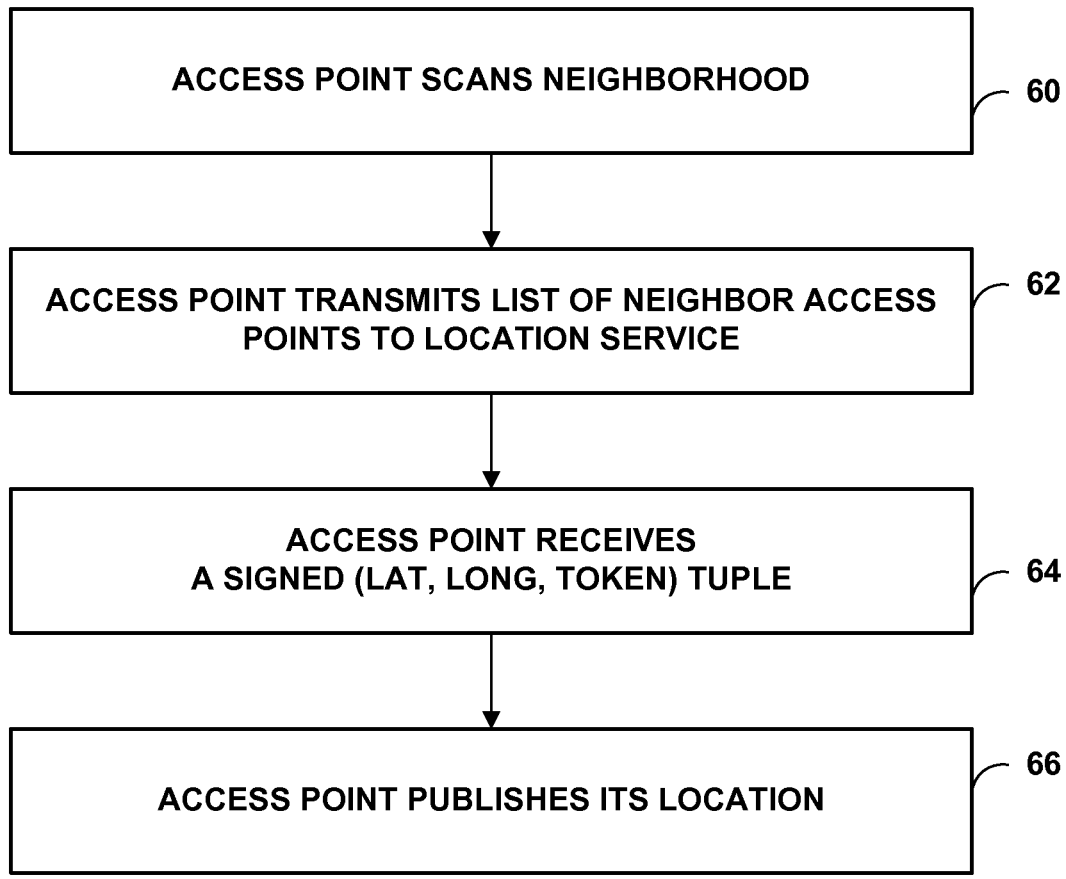
FIG. 8 is a flow chart illustrating an example process for determining a location of an access point, in accordance with one or more aspects of the present disclosure.

FIG. 8 is a flow chart illustrating an example process for determining a location of an access point, in accordance with one or more aspects of the present disclosure. FIG. 8 is described below in the context of system 10 of FIG. 7. For example, wireless access point 14 may perform operations 60-66 for determining the location of wireless access point 14, in accordance with one or more aspects of the present disclosure.

In one example approach, access points 14 publish their location in their beacon signal, or in response to probes from mobile computing devices 12 or from other access points 14. In the example approach of FIG. 8, an access point 14 scans its neighborhood at 60, either listening for the beacon signal or probing other network devices, such as wireless access points 14 or mobile computing devices 12. The scan of the surrounding wireless environment may yield a list of other access points 14 (and, in some approaches, of mobile computing devices 14 with known locations) and of their signal strengths. This list is sent at 62 to location service 18 (here shown as a location provider service in the cloud) where historical knowledge is used to determine the location of wireless access point 14. In one such approach, the list includes the basic service set identification (BSSID) of each of the access points 14 scanned along with a distance estimate for each access point based on an estimate of, for instance, RSSI or RTT. A response is then sent to the access point 14 with the appropriate location information at 64 and is published in the AP's beacon signal at 66 in a vendor specific information element (location IE). In one example approach, location service 18 validates the data in the list transferred by access point 14, determines a (latitude, longitude, token) triplet for the location of the access point and returns the triplet to access point 14. In one such approach, location service 18 signs the tuple with a digital signature before transmitting the signed tuple to the wireless access point 14.

In one example approach, if a wireless access point 14 receives validated location information (i.e., location information verified by a location provider) from a mobile computing device 12, wireless access point 14 may forward the device 12 location information to the location provider for use in determining the location of the wireless access point 14.

Location information can also be provisioned on an access point 14 by other means, such as by having an administrator stamp it on the access point 14, or by programming in the location at installation. However doing so has some disadvantages. For instance, location service 18 may not be able to validate the data transmitted to location service 18 when provisioning occurs.

As noted above, when wireless access points 14 scan their Wi-Fi neighborhood, they discover the location IE of other wireless access points 14, along with, in some cases, the Service Set Identifier (SSID) or BSSID of each wireless access point 14. A wireless access point 14 parses the location information and derives, in one example, latitude, longitude and token (lat, long, token) information from it. During the scan, wireless access points 14 also record an RSSI of the access points. Given all this information from three such access points, location service 18 computes the location of the wireless access point 14. If any of the access points offers two-way RTT, it can be used in place of RSSI to make the same computation with better results.

The token may also be used to convey location specific information. For instance, the token may be used to convey location information such as "the third floor of the parking garage", the city or country or other information that can be used by users of device 12 to orient themselves. In one such approach, the token establishes a rough location that is fine-tuned via RSSI or RTT location positioning.

As noted above, a wireless access point can lie about the location it is at, throwing off a device's calculation of its own location. This would generally prevent any useful applications. To prevent this, a new concept of 'trusted location provider' is introduced. The idea being that location information published by an access point can be signed by a trusted location provider—generally the entity that produced the (lat, long, token) triplet—and that signature can be verified by devices 12. If a device 12 trusts that location provider, then location information from that trusted location provider can be used by that device for whatever purposes it chooses.

In one example approach, location service 18 provides a signature with the (lat, long, token) triplet or with the (lat, long, token, BSSID) tuple (as shown in FIG. 5B). In one such approach, the signature is a public key certificate, but other certification techniques can be used as well.

A trusted location provider can be provisioned on a device by simply installing a public certificate on the device. Keys available in that certificate can be used to verify that location information was indeed generated by the location provider, and hasn't been tampered with. To prevent further location attacks like spoofing, the location triplet may be expanded to include other information, such as the BSSID of the wireless access point 14 and the time of the query. To make the information more reliable, in one example approach, location information is refreshed periodically (for instance, once a week or once a day). In some such approaches, devices 12 also include a policy of only choosing information that is relatively fresh, thus avoiding problems arising from relying on stale data.

Access points 14 can spoof the location information in other ways. For instance, access point 14 may pass incorrect values in the scan data access point 14 reports to location service 18 in the cloud. To counter this approach, location service 18 may perform checks to weed out invalid or incorrect requests from access points 14. First, location service 18 may compare information it received from one access point 14 against information it received from the surrounding access points 14. This helps in spotting malicious access points. In one example approach, location service 18 simply refuses to update the location information of malicious access points, allowing its location information to go stale. In some such approaches devices 12 ignore location information that has not been updated within a predefined time period.

In one approach, the location provider includes a processor 201 configured to store, in memory, location information received from other sources, compare the stored location information to information in the location data received from the wireless access point, and correct the information in the location data accordingly.

In one approach, the location provider compares the data representative of a distance between wireless access point 14 and a particular network device that was received from the wireless access point to distance data received from another source and modifies distance between point 14 and the other network device as a function of the distance data received from the other source.

In one approach, location service 18 uses data obtained from mobile computing devices 12 to verify that all the said access points 14 are indeed in the same vicinity. In one example approach, this approach is combined with techniques based on a comparison of data from different wireless access points to generate highly reliable results.

The above-described technique of having the access points maintain and distribute location information that is used by a mobile computing device 12 to determine its location is very effective. Unlike mobile computing devices, access points 14 typically do not move. Scans from such fixed points provide location service 18 with better data for modeling location. In addition, access points 14 are generally mounted up on the wall or ceiling and see much less variation in RSSI compared to devices 12 (because devices 12 can be in pockets/purses/bags etc.). Such an approach also contributes to better modelling accuracy.

The above described techniques also reduce the load on servers 200 hosting location service 18. Instead, devices 12 can compute location on their own. Furthermore, the approach provides better security. For example, system 10 will not connect to a particular wireless access point 14 unless it is at the location of the particular wireless access point, as defined by location information in token 506. Finally, the approach ensures faster location determination for common scenarios such as landing at an airport.

Figure 9:
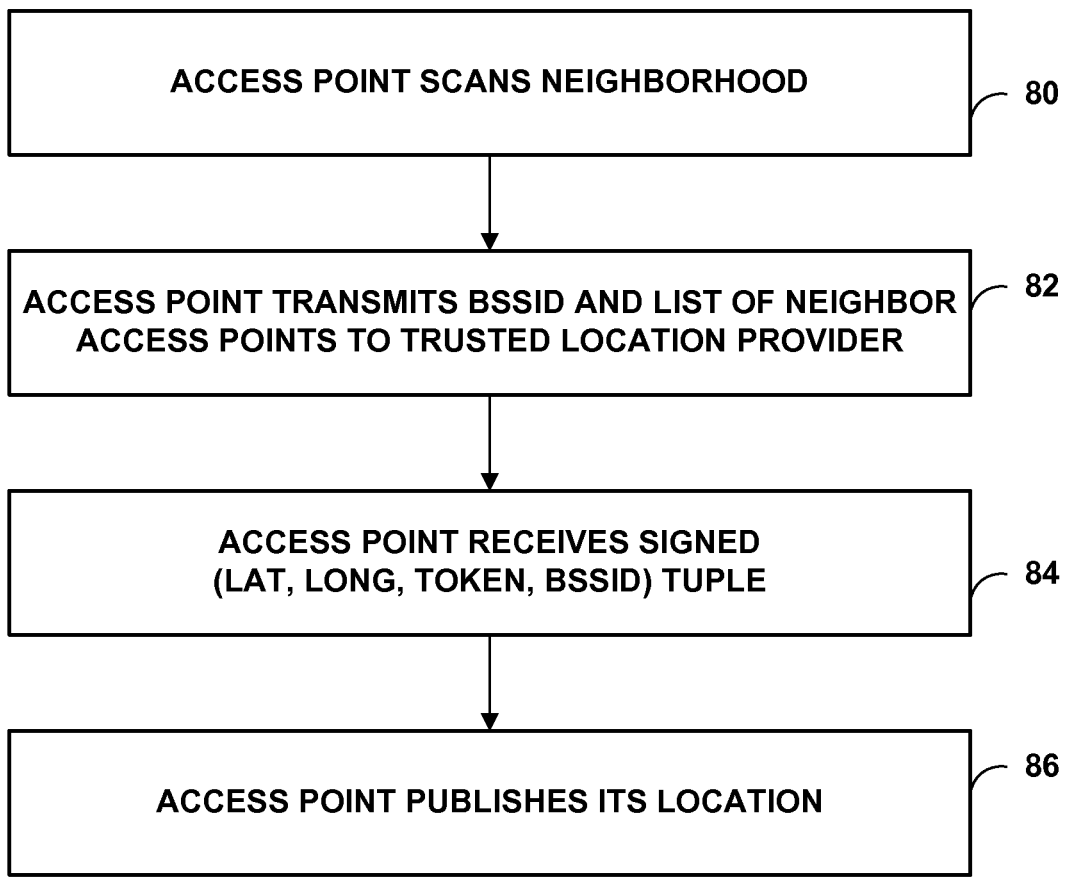
FIG. 9 is a flow chart illustrating another example process for determining a location of an access point, in accordance with one or more aspects of the present disclosure.

FIG. 9 is a flow chart illustrating another example process for determining a location of an access point, in accordance with one or more aspects of the present disclosure. FIG. 9 is described below in the context of system 10 of FIG. 7. For example, wireless access point 14 may perform operations 80-86 for determining the location of wireless access point 14, in accordance with one or more aspects of the present disclosure.

Once again, in one example approach, access points 14 publish their location in their beacon signal, or in response to probes from mobile computing devices 12 or from other access points 14. In the example approach of FIG. 9, an access point 14 scans its neighborhood at 80, either listening for the beacon signal or probing the other network devices, such as wireless access points 14. The scan of the surrounding Wi-Fi environment yields a list of other access points 14 and their signal strengths. This list is sent at 82 to the location service 18 where historical knowledge is used to determine the location of wireless access point 14. In one such approach, the list includes the basic service set identification (BSSID) of each of the access points 14 scanned along with a distance estimate for each access point based on an estimate of RSSI or RTT. A response is then sent to the access point 14 with the appropriate location information at 44 and is published in the AP's beacon signal at 86 in a vendor specific information element (location IE). In one example approach, location service 18 validates the data in the list transferred by access point 14, determines a (latitude, longitude, token, BSSID) tuple for the location of the access point, signs the tuple and returns the signed tuple with its embedded BSSID to access point 14.

Once again, is some example approaches, signed location information is updated periodically (for instance, once a day) in access points 14 to ensure better quality of information and, as noted above, to provide a mechanism for reducing the effect of malicious access points. In some such example approaches, malicious wireless access points 14 can be shut out by not being able to provide data with an appropriate update time.

Figure 10:
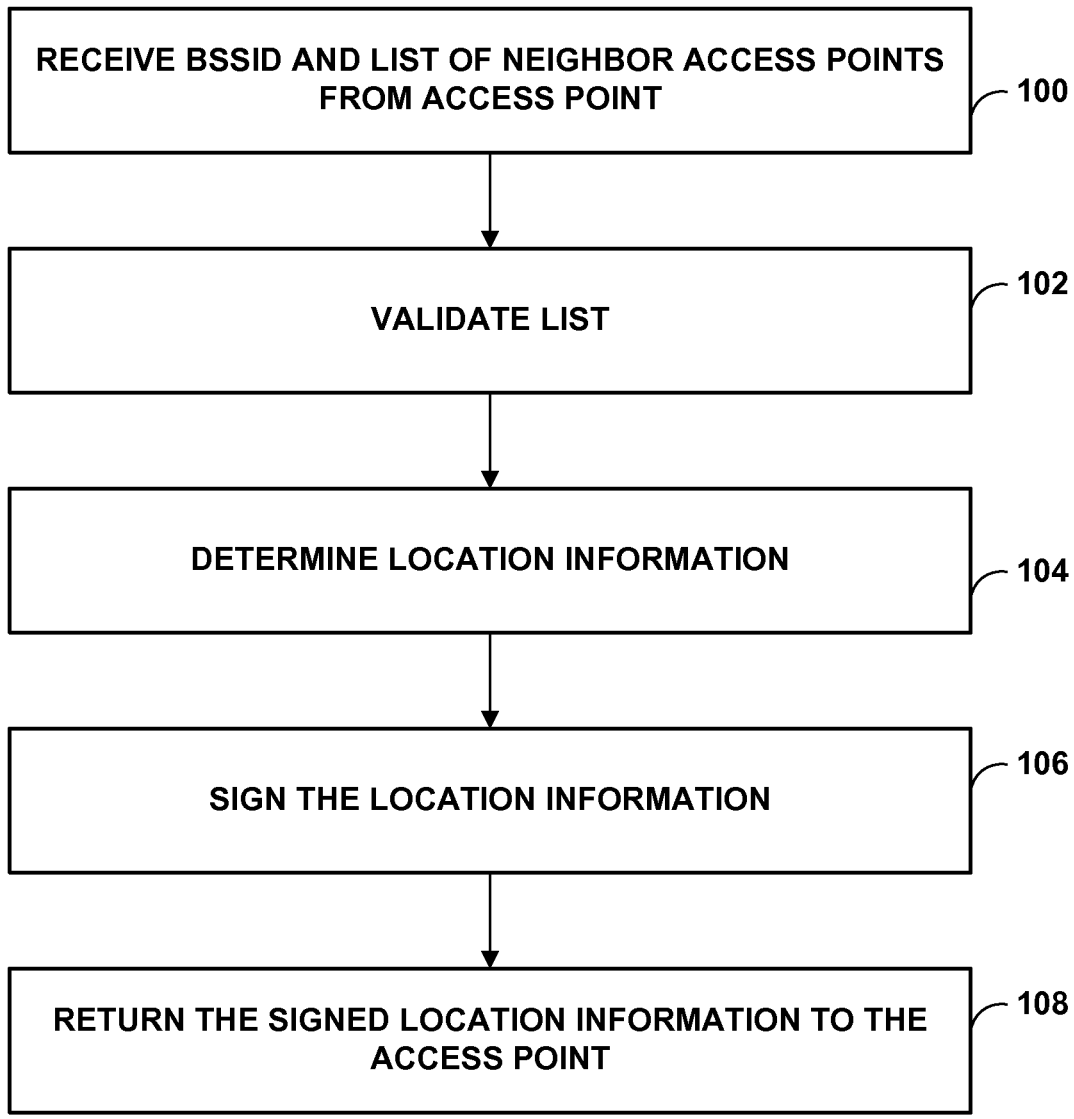
FIG. 10 is a flow chart illustrating an example process by which a location provider determines a location of an access point, in accordance with one or more aspects of the present disclosure.

FIG. 10 is a flow chart illustrating an example process by which a location provider determines a location of an access point, in accordance with one or more aspects of the present disclosure. FIG. 10 is described below in the context of system 10 of FIG. 1. For example, location service 18 may perform operations 100-108 for determining the location of wireless access point 14, in accordance with one or more aspects of the present disclosure. In the example approach of FIG. 10, trusted location service 18 receives, from a wireless access point 14, a list of other access points 14 and their signal strengths. (100) In one example approach, trusted location service 18 validates the data in the list transferred by access point 14 (102), determines a (latitude, longitude, token, BSSID) tuple for the location of the access point (104), signs the tuple (106) and returns the signed tuple to access point 14 (108). In one example approach, trusted location service 18 provides a signature with the (latitude, longitude, token, BSSID) tuple. In one such approach, the signature is a public key certificate, but other certification techniques can be used as well.

In one example approach, determining a (latitude, longitude, token, BSSID) tuple for the location of the access point includes looking at scan results provided from other sources such as other neighboring access points, or mobile computing devices to compute the location of the BSSID in question. In one example approach, if there is not enough data to calculate the location of the access point, or if location provider service 18 detects inconsistencies in the data, then a trusted location service 18 does not provide any location information to the asking Wi-Fi access point 14.

This technique allows the trusted location provider to gather data from multiple sources to pin specific BSSIDs at specific locations. Data collected from Wi-Fi access points is generally good quality data since most access points don't move (unlike mobile computing devices) and most access points are free from the occasional occlusion that happens to mobile computing devices (when they are placed in pockets, purses, etc.).

As noted above, a location provider such as location provider service 18 may decline to distribute location information to an access point 14 if there is not enough data to calculate the location of the access point, or if location provider service 18 detects inconsistencies in the data. Such an approach can be used to, for example, exclude access points. In some example approaches, a location provider service 18 may ignore the location contributions of an access point 14 if the location of that wireless access point cannot be confirmed by alternate sources. This approach also can be used with mobile computing devices; a location provider service 18 may collect location information from one or more of the mobile computing devices 12 for better location cross-confirmation.

In one example approach, a location provider compares the location data received from the wireless access point to location data from another source. If the location data received from the wireless access point is more than a threshold amount different than the location data from another source, the location provider determines the location data to use for generating the location of the wireless access point. In one such approach, the appropriate location data to use is the location data that matches most closely to location data received from other wireless devices, such as wireless access points 14 and mobile computing devices 12.

As noted above, there is no mechanism in present approaches for detecting a problem with a specific wireless access point or for reporting such a problem. To address this issue, in one approach, location provider service 18 may be configured to periodically determine and distribute a location for each of the wireless access points 14 in a particular area. In another approach, wireless access points 14 may be configured to refresh their location scans every day or every week in order to detect more quickly a problem with a particular wireless access point 14.

As noted above, mobile computing devices that use wireless access points to determine location are subject to attacks where location information published by access points may have been spoofed or compromised, compromising the ability of the mobile computing device to determine its location. For current mobile computing devices, the fidelity of the information received from the wireless access points is not guaranteed. As noted above, system 10 counters this, in some approaches, by protecting location information with a digital signature, such as a public key certificate, in order to detect that the location information may have been compromised and to prevent spoofing. Also as noted above, in some approaches, system 10 address the problems of spoofing and compromised data by including security data in order to detect that the location information may have been compromised and to prevent spoofing. In some approaches the security data includes an identifier identifying the wireless access point (such as the BSSID of the wireless access point) that should have been transmitting the location information. In some approaches, the security data includes an update date used to detect stale location information.

An advantage of the use of signatures to protect location information is that one can quickly determine if the information is from the correct location provider and if the signed location information has been compromised. An advantage of the distribution, in the location information, of wireless access point identifiers such as the BSSID of the wireless access point that is supposed to be transmitting the location is that one can compare the identifier against the transmitted identifier and determine if this is a spoofing attempt. An advantage of the use of an update date is that one can ensure that a compromised wireless access point eventually is ignored. All these techniques, when implemented, significantly increase the security and efficacy of location determination in a WLAN.

The use of location information to configure a mobile computing device will be discussed next. In one example approach, mobile computing device 12 determines the country or jurisdiction of the device using location information supplied by access points 14. In one such approach, mobile computing devices 12 use this information to determine any restrictions that may be placed on the use of the mobile computing device.

Requirements for operation of mobile computing devices 12 vary from country to country and it is difficult to determine country-specific rules when you first enter the country. To-date, there is no technology available to help device 12 determine the country and the rules for that country. At the same time, when a device 12 enters a new Wi-Fi environment, it attempts to scan on the channels of its home country. This can be a problem if the country the device is in uses Wi-Fi channels that are different than those of the home country. For instance, the U.S. allows use of channels 1-11 while Japan allows use of channels 1-13 and, in some case, channel 14. A visitor to the U.S. from Japan would not be allowed to use channels 12-14, but their mobile computing device may not be aware of or act on that restriction.

One approach to addressing this issue is to use the location information transmitted by wireless access points 14 to inform mobile computing devices 12 not only of their location in regard to map coordinates, but also of the country or jurisdiction of the location. Mobile computing device 12 may use the country information received from the wireless access points 14 to determine the jurisdiction, and to select Wi-Fi bands for operation accordingly.

In another example approach, mobile computing device 12 determines the country as a function of latitude and longitude using the information included in tuples such as the tuples shown in FIGS. 5A and 5B and discussed in FIG. 10 above.

Figure 11:
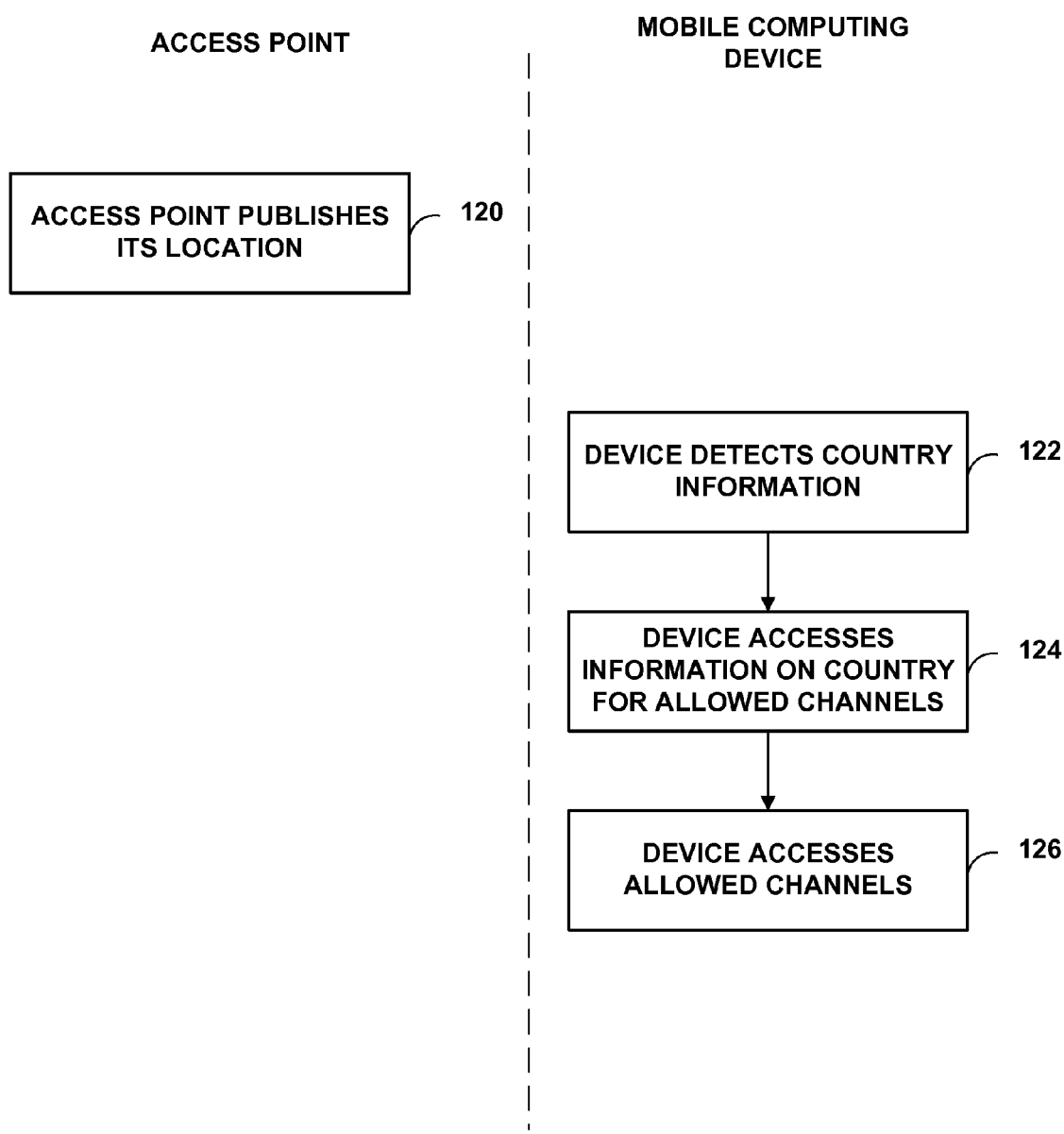
FIG. 11 is a flow chart illustrating an example mode of operation, in which a mobile computing device selects the Wi-Fi channels to scan based on a country identifier transmitted in the access point location information, in accordance with one or more aspects of the present disclosure.

FIG. 11 is a flow chart illustrating an example mode of operation, in which a mobile computing device selects the Wi-Fi channels to scan based on a country identifier transmitted in the access point location information, in accordance with one or more aspects of the present disclosure. FIG. 11 is described below in the context of system 10 of FIG. 1. For example, wireless access point 14 may perform operation 120 and mobile computing device 12 may perform operations 122-126 for determining the location of mobile computing device 12 and for determining the country and limitations on the operation of mobile computing device 12 in that country, in accordance with one or more aspects of the present disclosure.

In one example approach each access point 14 publishes, as part of the location information, a location indicator. For instance, access point may publish, as a location indicator, a country code for the country in which access point 14 is located. (120) A device 12, when entering a new location, listens on all available channels for a beacon containing location information and, on detecting the country code in such location information (122), reviews the channel restrictions (124) and only communicates on the allowed channels (126) for that jurisdiction. In one such approach, if the country code does not match a country code expected based on the latitude and longitude, the token or both, the country code is ignored. If this should happen, device 12 may determine country code solely based on other location information received from trusted access points 14.

In one example approach, access point 14 publishes the country code only when enabled by an administrator. Such an approach is advantageous in that country code may only be enabled at locations where, for example, travelers arrive into the country. The overhead of transmitting the country code is avoided at other locations.

In one example approach, the token is used to convey country information. In one such approach, mobile computing device 12 receives the token, decodes the location indicator code and accesses memory on device 12 to determine the allowed channels in that country. In addition, the token may be used to convey location information such as "the third floor of the parking garage" or the city or other information that can be used by users of device 12 to orient themselves.

Figure 12A:
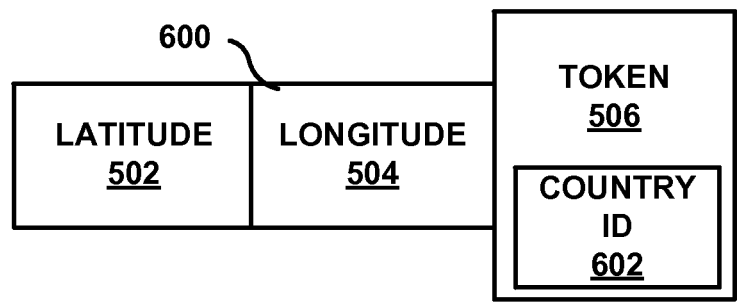
FIG. 12A illustrates a country identifier based example (lat, long, token) tuple, in accordance with one or more aspects of the present disclosure.

FIG. 12A illustrates a country identifier based example (lat, long, token) triple, in accordance with one or more aspects of the present disclosure. In the example shown in FIG. 12A, the location information is transmitted as a triple 600 that includes a latitude 502, a longitude 504 and a token 506. Token 506 includes a country identifier 602 used, as noted above in the discussion of FIG. 11, in determining the present country or jurisdiction for mobile computing device 12. In addition, token 506, in some examples, includes descriptive information used by mobile computing device 12 to display its location within a context. For instance, token 506 may include text such as "$4^{th}$ floor parking garage" that, when received by mobile computing device 12, is used to label a map showing the location of mobile computing device 12.

Figure 12B:
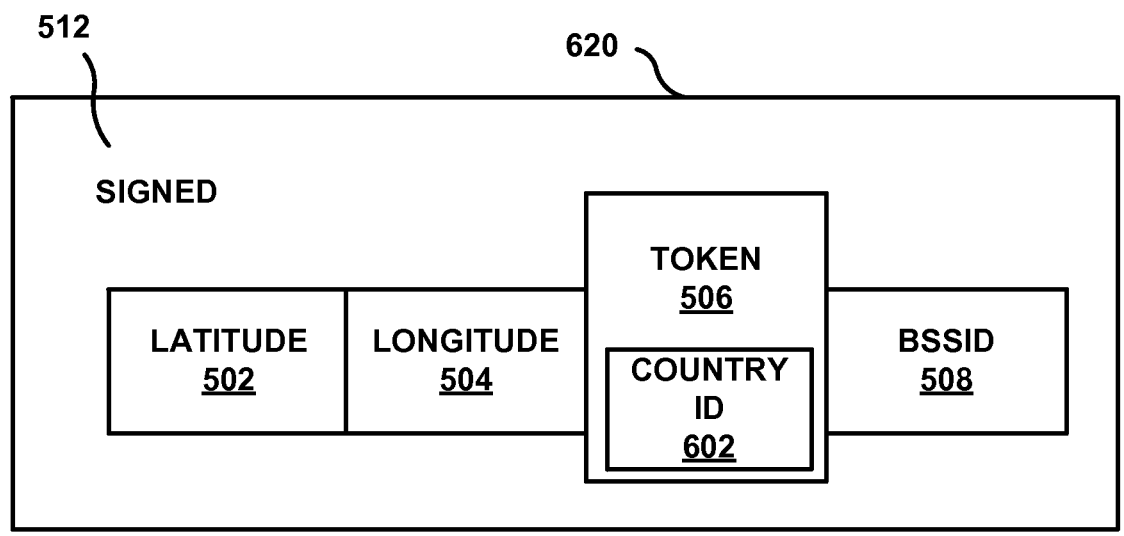
FIG. 12B illustrates a country identifier based example signed (lat, long, token, BSSID) tuple, in accordance with one or more aspects of the present disclosure.

FIG. 12B illustrates country identifier based example signed (lat, long, token, BSSID) tuple, in accordance with one or more aspects of the present disclosure. In the example shown in FIG. 12B, the location information is transmitted as a tuple 620 that includes a latitude 502, a longitude 504, a token 506 and a source identifier 508. In the example shown in FIG. 12B, source identifier 508 is the basic service set identification (BSSID) of the wireless access point that is supposed to have transmitted the location information. A mobile computing device 12 receives tuple 620, verifies that the tuple 620 is from the expected trusted location service 18 and then verifies that tuple 620 is from the wireless access point that transmitted tuple 620 has a BSSID that matches the BSSID in tuple 620. In some example approaches, trusted provider 18 signs tuple 620 with a public key 512.

As noted above in reference to FIG. 12A, token 506, in some examples, includes a country identifier 602 used, as noted above in the discussion of FIG. 11, in determining the present country or jurisdiction for mobile computing device 12. In addition, token 506, in some examples, includes descriptive information used by mobile computing device 12 to display its location within a context.

Clause 1. A method, comprising: determining, by a location provider and based on location data, a location of a wireless access point, the location data including location data from each of a plurality of network devices, wherein the location data for each network device includes the network device's location and data representative of a distance between the wireless access point and each network device; generating, by the location provider and based on the location of the wireless access point, location information for the wireless access point; signing the location information with a credential to form signed location information; and communicating the signed location information to the wireless access point.

Clause 2. The method of clause 1, wherein determining a location includes comparing the location data received from the wireless access point to location data from another source and, if the location data received from the wireless access point is more than a threshold amount different than the location data from another source, determining location data to use for generating the location of the wireless access point.

Clause 3. The method of any of clauses 1-2, wherein the network devices include mobile computing devices with known locations.

Clause 4. The method of any of clauses 1-3, wherein generating location information includes determining the location of the wireless access point expressed in latitude and longitude and recording the latitude and longitude of the wireless access point in the location information.

Clause 5. The method of any of clauses 1-4, wherein generating location information includes: determining the location of the wireless access point expressed in latitude and longitude; forming a tuple, wherein the tuple includes a token and the latitude and longitude of the wireless access point; and recording the tuple within the location information for the wireless access point.

Clause 6. The method of any of clauses 1-5, wherein the wireless access point includes a basic service set identification (BSSID) and wherein forming a tuple includes recording the BSSID of the wireless access point within the tuple.

Clause 7. The method of any of clauses 1-6, wherein generating location information includes comparing location information received from other sources to the location data received from the wireless access point.

Clause 8. A location provider, comprising: a network connection; memory; and one or more processors, wherein each processor is connected to the memory, wherein the processor is configured to: determine, based on location data stored in the memory, a location of a wireless access point, the location data including location data from each of a plurality of network devices, wherein the location data for each network device includes the network device's location and data representative of a distance between the wireless access point and the network device; generate, based on the location determined for the wireless access point, location information for the wireless access point; sign the location information for the wireless access point with a credential to form signed location information; store the signed location information in the memory; and communicate the signed location information to the wireless access point.

Clause 9. The location provider of clause 8, wherein the processor is further configured to: store, in the memory, location information received from other sources; compare the stored location information to information in the location data received from the wireless access point; and correct the information in the location data accordingly.

Clause 10. The location provider of any of clauses 8-9, wherein determining the location of the wireless access point includes: comparing data representative of a distance between the wireless access point and a particular network device received from the wireless access point to distance data received from another source; and modifying the data representative of the distance between the wireless access point and the particular network device as a function of the distance data received from the other source.

Clause 11. A system, comprising: a location provider; a plurality of wireless access points connected to the location provider, wherein the plurality of access points includes a plurality of first wireless access points; and a mobile computing device comprising a wireless interface configured to connect to one or more wireless access points from the plurality of wireless access points, wherein the location provider determines a location for each wireless access point and communicates the location as location information to the corresponding wireless access point, wherein the location information for each of the first wireless access points is signed with a digital signature associated with the location provider, wherein each wireless access point from the plurality of wireless access points wirelessly transmits the location information for that wireless access point, wherein the mobile computing device receives the signed location information transmitted by the first wireless access points and verifies that the signed location information for each first wireless access point was signed by the location provider, wherein first wireless access points with location information verified as having been signed by the location provider are verified first wireless access points, wherein the mobile computing device calculates a distance to each of the verified first wireless access points, and wherein the mobile computing device determines a location of the mobile computing device based on the distance to each of the verified first wireless access points and on the location information received from each of the verified first wireless access points.

Clause 12. The system of clause 11, wherein the plurality of wireless access points further includes one or more second wireless access points, wherein each second wireless access point transmits, to the mobile computing device, location information for that second wireless access point, and wherein the mobile computing device calculates a distance to each of the second wireless access points and determines the location of the mobile computing device based on the distance to each of the verified first wireless access points, on the distance to each of the second wireless access points, on the location information received from each of the second wireless access points and on the location information received from each of the verified first wireless access points.

Clause 13. The system of any of clauses 11-12, wherein the location information includes security data selected from a security data group including a source identifier and a last update indicator.

Clause 14. The system of any of clauses 11-13, wherein the location information is transmitted as a tuple, wherein the tuple includes latitude, longitude and a token comprising security data.

Clause 15. The system of any of clauses 11-14, wherein the mobile computing device checks location information received from the wireless access point using the security data.

Clause 16. The system of any of clauses 11-15, wherein the source identifier includes the basic service set identification (BSSID) of the wireless access point and wherein the mobile computing device verifies that the BSSID in the location information matches the BSSID of the wireless access point transmitting the location information.

Clause 17. The system of any of clauses 11-16, wherein the location information includes the basic service set identification (BSSID) of the wireless access point, and wherein the mobile computing device verifies that the BSSID of the wireless access node transmitting the location information matches the BSSID included in the location information transmitted by the wireless access node and, if the BSSID in the location information does not match the BSSID of the wireless access point transmitting the location information, prevents the location information from being used to determine location of the mobile computing device.

Clause 18. The system of any of clauses 11-17, wherein the mobile computing device maintains a table of location information indexed by BSSID, wherein the table of location information is used to obtain the wireless access point location of a wireless access point when trusted location information is not available from that wireless access point.

Clause 19. The system of any of clauses 11-18, wherein the location information for a particular wireless access point includes an update time and wherein the mobile computing device discards location information for that particular wireless access point when the update time indicates that the location information is stale.

Clause 20. The system of any of clauses 11-19, wherein the mobile computing device is communicatively connected to the location provider and wherein the communicatively connected mobile computing device communicates its location, as determined based on the location information transmitted by each of the plurality of wireless access points, to the location provider for verification.

Clause 21. A method, comprising: receiving, by a wireless device, respective signed location information from each of a plurality of wireless access points, wherein the respective signed location information includes location information for the corresponding wireless access point; determining, by the wireless device, based on the respective signed location information, whether any of the respective signed location information has been compromised; and determining, by the wireless device and based on the signed location information that is not compromised and on data representative of a distance between the wireless device and each wireless access point with signed location data that has not been compromised, a location of the wireless device.

Clause 22. The method of clause 21, wherein determining includes transmitting the location of the wireless device to a location provider for verification.

Clause 23. The method of any of clauses 21-22, wherein the signed location information includes a last update indicator and wherein reviewing includes treating the signed location information as compromised if the update time is older than a predefined amount of time.

Clause 24. The method of any of clauses 21-23, wherein the signed location information includes a (lat, long, token) tuple indicating the location of the wireless access point that transmitted the signed location information, wherein the token includes security data and wherein reviewing further includes reviewing the security data and treating the signed location information as compromised if the security data is not as expected.

Clause 25. The method of any of clauses 21-24, wherein the token includes a basic service set identification (BSSID) that should match the BSSID of the wireless access points transmitting the signed location information containing the token, and wherein reviewing includes comparing the BSSID from the signed location information to the BSSID of the wireless access point that transmitted the signed location information and treating the signed location information as compromised if the BSSID from the signed location information does not match the BSSID of the wireless access point that transmitted the signed location information.

Clause 26. The method of any of clauses 21-25, wherein the wireless device is a mobile computing device, wherein the location information includes a location indicator and wherein the mobile computing device changes operating parameters based on the location indicator.

Clause 27. The method of any of clauses 21-26, wherein the wireless device is a mobile computing device, wherein the location information includes a country code and wherein the mobile computing device selects Wi-Fi bands to scan based on the country code.

Clause 28. A device, comprising: memory; a wireless interface; and a processor connected to the memory and to the wireless interface, wherein the processor is configured to: store, in memory, signed location information received from each of a plurality of wireless access points and data representative of a distance between the mobile computing device and each wireless access point, the signed location information identifying a location for each wireless access point; review the signed location information to determine if the signed location information of any wireless access points has been compromised; determine, based on the signed location information that is not compromised and on data representative of a distance between the mobile computing device and each wireless access point with signed location data that has not been compromised, a location of the mobile computing device; and store, in memory, the location of the mobile computing device.

Clause 29. The device of clause 28, wherein the signed location information for each wireless access point includes a basic service set identification (BSSID) that should match the BSSID of the wireless access point transmitting the signed location information, and wherein the processor is further configured to compare the BSSID from the signed location information to the BSSID of the wireless access point that transmitted the signed location information and to treat the signed location information as compromised if the BSSID from the signed location information does not match the BSSID of the wireless access point that transmitted the signed location information.

Clause 30. The device of clauses 28-29, wherein the plurality of wireless access points further includes one or more unsecured wireless access points, wherein the unsecured wireless access points transmit location information that is not signed, wherein the processor is further configured to calculate a distance to each of the unsecured wireless access points, and wherein the processor is further configured to determine the location of the mobile computing device based on the distance to each of the wireless access points with signed location information that has not been compromised, on the distance to each of the unsecured wireless access points, on the unsigned location information received from the unsecured wireless access points and on the signed location that has not been compromised.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable medium may include computer-readable storage media or mediums, which corresponds to a tangible medium such as data storage media, or communication media including any medium that facilitates transfer of a computer program from one place to another, e.g., according to a communication protocol. In this manner, computer-readable medium generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. Although the examples have been described in the context of a Wi-Fi network, the techniques described above can be used in any wireless local area network. These and other examples are within the scope of the following claims.

The invention claimed is:

1. A method, comprising:
   receiving, by a cloud-based location provider and from a wireless access point, initial location information including a respective location of each of a plurality of other wireless access points and data representative of respective distances between the wireless access point and each of the plurality of other wireless access points;
   determining, by the cloud-based location provider and based on the initial location information and location data stored at a location information data store of the cloud-based location provider, a location of the wireless access point including a latitude and a longitude, wherein the location data includes respective location data for each known wireless access point from a plurality of known wireless access points, wherein one or more wireless access points from the plurality of other wireless access points are included in the plurality of known wireless access points, and wherein the respective location data for each known wireless access point includes a respective location of the known wireless access point and data representative of a distance between the known wireless access point and at least one other known wireless access point from the plurality of known wireless access points;
   generating, by the cloud-based location provider, a tuple for the wireless access point, the tuple including a token, the latitude, and the longitude, wherein the token includes a description of the location of the wireless access point;
   storing, by the cloud-based location provider and in the location information data store, the tuple for the wireless access point;
   signing, by the cloud-based location provider, the tuple with a credential to form signed location information; and
   communicating, by the cloud-based location provider and to the wireless access point, the signed location information.

2. The method of claim 1, further comprising:
   receiving, by the cloud-based location provider and from the plurality of other wireless access points, respective location data for each of the plurality of other wireless access points;
   wherein determining the location of the wireless access point further comprises:
      determining, by the cloud-based location provider and based on the initial location data received from the wireless access point and the respective location data for each of the plurality of other wireless access points, whether the initial location information is more than a threshold amount different than the respective location data for each of the plurality of other wireless access points,
      responsive to determining that the initial location data is more than the threshold amount different, determining that the wireless access point is a malicious wireless access point; and
      determining the location of the wireless access point based on the respective location data for each of the plurality of other wireless access points.

3. The method of claim 1, wherein the tuple includes a basic service set identification of the wireless access point.

4. A cloud-based computing system, comprising:
   a network interface that receives, from a wireless access point, initial location information including a respective location of each of a plurality of other wireless access points and data representative of respective distances between the wireless access point and each of the plurality of other wireless access points;
   a memory configured to store one or more modules; and
   one or more processors, wherein the one or more modules are operable by the one or more processors to:
      determine, based on the initial location information and location data stored in the memory a location of the wireless access point including a latitude and a longitude, wherein the location data includes respective location data for each known wireless access point from a plurality of known wireless access points, wherein one or more wireless access points from the plurality of other wireless access points are included in the plurality of known wireless access points, and wherein the respective location data for each known wireless access point includes a respective location of the known wireless access point and data representative of a distance between the known wireless access point and at least one other known wireless access point from the plurality of known wireless access points;

generate a tuple for the wireless access point, the tuple including a token, the latitude, and the longitude, wherein the token includes a description of the location of the location of the wireless access point;

sign the location information for the wireless access point with a credential to form signed location information;

store the signed location information in the memory; and communicate the signed location information to the wireless access point.

5. The cloud-based computing system of claim 4, wherein:

the network interface receives, from the plurality of other wireless access points, respective location data for each of the plurality of other wireless access points;

the one or more modules are operable by the one or more processors to determine the location of the wireless access point by at least being operable to:

determine, based on the initial location information received from the wireless access point and the respective location data for each of the plurality of other wireless access points, whether the initial location information is more than a threshold amount different than the respective location data for each of the plurality of other wireless access points;

responsive to determining that the initial location data is less than the threshold amount different, update the location of the wireless access point; and responsive to determining that the initial location data is more than the threshold amount different:

determine that the wireless access point is a malicious wireless access point; and responsive to determining that the wireless access point is the malicious wireless access point, refrain from updating the location of the wireless access point.

6. A system, comprising:

a cloud-based location provider;

a plurality of wireless access points connected to the cloud-based location provider; and a mobile computing device comprising a wireless interface configured to connect to one or more wireless access points from the plurality of wireless access points, wherein the cloud-based location provider determines a respective location for each wireless access point from the plurality of wireless access points and communicates the respective location as respective tuples to the corresponding wireless access point, wherein the respective tuples for each of the wireless access points includes a respective latitude, a respective longitude, and a respective description of the location of the corresponding wireless access point and is signed with a digital signature associated with the cloud-based location provider, wherein each wireless access point from the plurality of wireless access points wirelessly transmits the respective tuple for that wireless access point, wherein the mobile computing device:

receives, from two or more wireless access points from the plurality of wireless access points, the respective tuples for the two or more wireless access points, determines whether the respective tuple for each of the two or more wireless access points was signed by the cloud-based location provider, for each wireless access point for which the mobile computing device determined that the respective tuples were signed by the cloud-based wireless access provider, calculates a respective distance between the mobile computing device and the wireless access point, and determines a location of the mobile computing device based on the respective distances and the respective latitudes and longitudes included in the tuples determined to be signed by the cloud-based location provider.

7. The system of claim 6, wherein the respective tuples further include one or more of a source identifier and a last update indicator.

8. The system of claim 6, wherein respective tuples further include security data, and wherein the mobile computing device:

determines whether the respective tuple for each of the two or more wireless access points was compromised by at least comparing the security data included in the respective tuple to expected security data; and determines the location of the mobile computing device based on the respective tuples that are signed and determined to not be compromised.

9. The system of claim 8, wherein the security data includes the basic service set identification of the wireless access point, and wherein the mobile computing device compares the basic service set identification included in the respective tuple to a basic service set identification broadcast by the wireless access point.

10. The system of claim 9 wherein the mobile computing device, responsive to determining that the basic service set identification in the respective tuple does not match the basic service set identification of the wireless access point transmitting the respective tuples, determines that the respective tuple is compromised.

11. The system of claim 10, wherein the mobile computing device maintains a table of location information indexed by basic service set identification, and wherein the table of location information is used to obtain the wireless access point location of a particular wireless access point when trusted location information is not available from the particular wireless access point.

12. The system of claim 6, wherein the location information for a particular wireless access point includes an update time and wherein the mobile computing device discards location information for that particular wireless access point when the update time indicates that the location information is stale.

13. The system of claim 6, wherein the mobile computing device is communicatively connected to the cloud-based location provider, and wherein the mobile computing device transmits the location of the mobile computing device as determined based on the respective tuple transmitted by each of the plurality of wireless access points, to the cloud-based location service for verification.

14. A method, comprising: receiving, by a wireless device, respective signed location information from each of a plurality of wireless access points, wherein the respective signed location information includes a tuple comprising a latitude, a longitude and a token, indicating a location of the wireless access point that transmitted the respective signed location information, and wherein the token included in the tuple includes a first basic service set identification for the wireless access point that transmitted the respective signed location information; receiving, by the wireless device, a respective second basic service set identification broadcast by each of the plurality of wireless access point; determining whether the first basic service set identification included in the tuple of the respective signed location information matches the second basic service set identification broadcast by the corresponding wireless access point; responsive to determining that the first basic service set identification included in the tuple of the respective signed location information matches the second basic service set identification broadcast by the corresponding wireless access point, determining that the respective signed location information has not been comprised; for each wireless access point for which the mobile computing device determined that the respective signed location information was not compromised, calculating a respective distance between the mobile computing device and the corresponding wireless access point; and determining, by the wireless device and based on the latitude and longitude included in respective signed location information that is not compromised and the respective distances between the wireless device and each of the plurality of wireless access points associated with respective signed location information that has not been compromised, a location of the wireless device.

15. The method of claim 14, wherein the respective signed location information includes a last update indicator specifying the time the respective signed location information was last updated, the method further comprising:
responsive to determining that the time the respective signed location information was last updated is older than a predefined amount of time, determining that the respective signed location information is compromised.

16. The method of claim 14, wherein the wireless device is a mobile computing device, wherein the respective signed location information includes a location indicator and wherein the mobile computing device changes operating parameters based on the location indicator.

17. The method of claim 14, wherein the wireless device is a mobile computing device, and wherein the respective signed location information includes a country code, the method further compromising:
selecting, by the mobile computing device and based on the country code, one or more Wi-Fi bands from a plurality of Wi-Fi bands to scan.

18. A mobile computing device, comprising:
a memory;
a wireless network interface; and
a processor connected to the memory and to the wireless interface, wherein the processor is configured to:
store, in the memory, respective signed location information received from each of a plurality of wireless access points and respective data representative of a distance between the mobile computing device and each wireless access point, the signed location information including a (latitude, longitude, token) tuple indicating the location of the wireless access point that transmitted the respective signed location information, and wherein the token includes a first basic service set identification for the wireless access point that transmitted the respective signed location information;
receive a respective second basic service set identification broadcast by each of the plurality of wireless access point;
determine whether the first basic service set identification included in the tuple of the respective signed location information matches the second basic service set identification broadcast by the corresponding wireless access point;
responsive to determining that the first basic service set identification included in the tuple of the respective signed location information matches the second basic service set identification broadcast by the corresponding wireless access point, determine that the respective signed location information has not been comprised;
for each wireless access point for which the device determined that the respective signed location information was not compromised, calculating, based on the respective data representative of the distance between the mobile computing device and the corresponding wireless access point, a respective distance between the mobile computing device and the corresponding wireless access point; and
determine, based on the latitude and longitude included in the respective signed location information that is not compromised and the respective distances between the mobile computing device and each of the plurality of wireless access points associated with respective signed location information that has not been compromised, a location of the wireless device.

19. The mobile computing device of claim 18, wherein the processor is further configured to:
receive, from one or more unsecured wireless access points, unsigned location information;
calculate a respective distance to each of the one or more unsecured wireless access points; and
determine the location of the mobile computing device based on the distance to each of the plurality wireless access points with the respective signed location information that has not been compromised, on the respective distance to each of the one or more unsecured wireless access points, on the unsigned location information, and on the respective signed location information that has not been compromised.

* * * * *